(12) United States Patent
Kawamura et al.

(10) Patent No.: US 11,471,769 B2
(45) Date of Patent: Oct. 18, 2022

(54) GAME SYSTEM, STORAGE MEDIUM FOR USE THEREWITH, AND CONTROL METHOD

(71) Applicant: Konami Digital Entertainment Co., Ltd., Tokyo (JP)

(72) Inventors: Kazuyasu Kawamura, Tokyo (JP); Takanori Murayama, Tokyo (JP); Mamoru Tanimoto, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 17/159,419

(22) Filed: Jan. 27, 2021

(65) Prior Publication Data

US 2021/0146252 A1 May 20, 2021

Related U.S. Application Data

(63) Continuation of application No. PCT/JP2019/008961, filed on Mar. 6, 2019.

(30) Foreign Application Priority Data

Jul. 31, 2018 (JP) .............................. JP2018-144416

(51) Int. Cl.
*A63F 13/56* (2014.01)
(52) U.S. Cl.
CPC .................................... *A63F 13/56* (2014.09)
(58) Field of Classification Search
CPC .......... A63F 13/25; A63F 13/42; A63F 13/56; A63F 13/426; A63F 13/44; A63F 13/45;
(Continued)

(56) References Cited

U.S. PATENT DOCUMENTS 7,786,976 B2 * 8/2010 Ohta ..................... G06F 3/0346
345/158
8,202,147 B2 * 6/2012 Yamada .................. A63F 13/56
463/31
(Continued)

FOREIGN PATENT DOCUMENTS

JP 2009056181 A 3/2009
JP 2016189972 A 11/2016
(Continued)

OTHER PUBLICATIONS

International Search Report dated Jun. 4, 2019, in International Application No. PCT/JP2019/008961.
(Continued)

*Primary Examiner* — David L Lewis
*Assistant Examiner* — Matthew D Hoel
(74) *Attorney, Agent, or Firm* — Sughrue Mion, PLLC

(57) ABSTRACT

Provided is a game system or the like capable of setting a game field relatively wide. This game system provides a training game that progresses through a navigation character or a waiting character that moves in accordance with a user instruction in a game field of a monitor that displays a room screen including the game field. Further, for example, the game system specifies a position relationship between a waiting position and a guide position, when the user instructs the waiting character to move from the waiting position to the guide position in the game field, and changes a moving speed of the waiting character between a normal speed and a special speed in accordance with the specified position relationship, when the waiting character moves from the waiting position to the guide position.

20 Claims, 17 Drawing Sheets

(58) Field of Classification Search
CPC ...... A63F 13/50; A63F 13/803; A63F 13/807; A63F 2300/64; A63F 2300/643; A63F 2300/646
See application file for complete search history.

(56) References Cited

U.S. PATENT DOCUMENTS

| | | | | |
|---|---|---|---|---|
| 8,298,080 | B2* | 10/2012 | Kojima | A63F 13/5258 463/31 |
| 8,376,851 | B2* | 2/2013 | Yamada | A63F 13/57 463/31 |
| 8,868,388 | B2* | 10/2014 | Sakairi | G06F 30/23 703/7 |
| 8,947,427 | B2* | 2/2015 | Shuster | H04L 65/403 345/419 |
| 8,979,652 | B1* | 3/2015 | Ciszewski | G06T 19/20 463/32 |
| 9,046,994 | B2* | 6/2015 | Shuster | G06T 19/003 |
| 9,079,100 | B2* | 7/2015 | Watabe | A63F 13/822 |
| 9,087,399 | B2* | 7/2015 | Shuster | G06F 40/14 |
| 9,238,175 | B2* | 1/2016 | Ciszewski | A63F 13/47 |
| 9,386,022 | B2* | 7/2016 | Shuster | G06F 3/04815 |
| 9,471,983 | B2* | 10/2016 | Yagishita | G06T 7/73 |
| 9,473,503 | B2* | 10/2016 | Shuster | H04L 65/403 |
| 9,509,699 | B2* | 11/2016 | Burch | H04L 67/02 |
| 9,533,224 | B2* | 1/2017 | Yamada | A63F 13/525 |
| 9,533,225 | B2* | 1/2017 | Sakurai | A63F 13/426 |
| 9,610,507 | B2* | 4/2017 | Watabe | A63F 13/822 |
| 9,733,048 | B2* | 8/2017 | Hu | A63F 13/27 |
| 9,930,043 | B2* | 3/2018 | Shuster | H04L 63/08 |
| 10,083,212 | B2* | 9/2018 | Kim | G06F 16/24578 |
| 10,525,354 | B2* | 1/2020 | Sato | A63F 13/44 |
| 10,556,180 | B2* | 2/2020 | Zhu | A63F 13/30 |
| 10,582,182 | B2* | 3/2020 | Gay | H04N 13/156 |
| 10,694,163 | B2* | 6/2020 | Ueda | A63F 13/5378 |
| 10,821,362 | B2* | 11/2020 | Tanaka | A63F 13/56 |
| 10,979,631 | B2* | 4/2021 | Yoshimura | H04N 5/23232 |
| 11,013,999 | B2* | 5/2021 | Kusakihara | G06F 3/04815 |
| 11,050,989 | B2* | 6/2021 | Ueda | A63F 13/5378 |
| 2009/0104990 | A1* | 4/2009 | Tsujino | A63F 13/57 463/32 |
| 2018/0199022 | A1* | 7/2018 | Ueda | H04N 13/111 |

FOREIGN PATENT DOCUMENTS

| | | |
|---|---|---|
| JP | 2018108150 A | 7/2018 |
| JP | 2018110659 A | 7/2018 |

OTHER PUBLICATIONS

Written Opinion of the International Searching Authority dated Jun. 4, 2019, in International Application No. PCT/JP2019/008961.
Communication dated Nov. 19, 2019, from the Japanese Patent Office in application No. 2018144416.
Kabushiki Qbist, "Metal Gear Solid V: The Phantom pain official complete guide" Kadokawa Dwango Corporation Hamamura Hirokazu, Nov. 13, 2015, first edition, pp. 111-112 (4 pages total).
Communication dated Aug. 19, 2022 issued by the Korean Patent Office in counterpart Korean Application No. 10-2021-7003110.

* cited by examiner

GAME SYSTEM, STORAGE MEDIUM FOR USE THEREWITH, AND CONTROL METHOD

TECHNICAL FIELD

The present invention relates to a game system and the like, which provide a game that progresses through a character or characters configured to move in accordance with a user instruction in a game field of a display device that displays a game screen including the game field.

BACKGROUND ART

Various game systems are known to provide games that progress through a character that moves in accordance with the user instruction in the game field of the display device that displays the game screen including the game field. Patent Literature 1 exists as a prior art document that is relevant to the present invention.

CITATION LIST

Patent Literature

Patent Literature 1: JP2018-108150A

SUMMARY OF INVENTION

Technical Problem

As shown in Patent Literature 1, there is a type of simulation game that trains idols as characters to be trained. Such simulation games often have a screen called a "room," which corresponds to the so-called home screen. On such a screen, one of the characters owned by the user (the character to be trained) functions usually as a navigator to execute various guidance about the game such as guidance about various modes or the like. On the other hand, even if the user owns a plurality of characters, only one character who functions as the navigator appears on such a screen in most cases. Therefore, if the navigator character is not changed, the user may not have an opportunity to contact or even see other characters on such a screen. However, changing the navigator character is often troublesome and results in fewer opportunities to interact with other characters. As a result, the user only contacts particular characters, which can fix the characters that the user comes into contact with and the game bores the user.

On the other hand, in the aforementioned simulation games in which idols are trained, characters other than the navigator may be displayed on the screen called the "room" as described above. These screens and characters are often displayed to make a virtual three-dimensional space. In such virtual three-dimensional spaces, the characters other than the navigator may move closer to the user (closer to the front in the virtual three-dimensional space) upon a predetermined operation to the characters other than the navigator. In other words, such a simulation game may also function as the game that progresses through characters that move in accordance with the user instruction. On the other hand, such movement is often not inherently related to the progress of the game itself, and the user is likely to find the time required for such movement undesirable. To reduce the time required, the virtual three-dimensional space, i.e., the game field itself which is the stage for the movement of characters, is often narrowed. However, such a screen may cause an oppressive feeling. In addition, because the game field is so narrow, other characters may come between the virtual camera used to create a two-dimensional image of the game field (the virtual three-dimensional space) and the navigator character. Since awareness of the user is often focused on the navigator, such cases can interfere with play and cause stress to the user. In addition, if the game field is narrow, there may not be enough room to place a large number of characters, resulting in only the navigator character being displayed on the screen, or only one or two more characters being displayed on the screen in a short period of time even if other characters are displayed.

Therefore, it is an object of the present invention to provide the game system or the like which is capable of setting the game field relatively wide.

Solution to Problem

The game system of the present invention is a game system providing a game that progresses through a character configured to move in accordance with a user instruction in a game field of a display device adapted to display a game screen including the game field, and the game system comprises a relationship specifying unit that specifies a position relationship between a predetermined position and an arrival position when the character is instructed to move from the predetermined position to the arrival position in the game field by a user, and a speed changing unit that changes a moving speed of the character in accordance with the position relationship when the character moves from the predetermined position to the arrival position.

On the other hand, a non-transitory computer readable storage medium of the present invention is a non-transitory computer readable storage medium storing a computer program that is configured to cause a computer connected to the display device and an input device adapted to input an instruction of the user to function as the respective units of the above-described game system.

DESCRIPTION OF EMBODIMENTS

Figure 1:
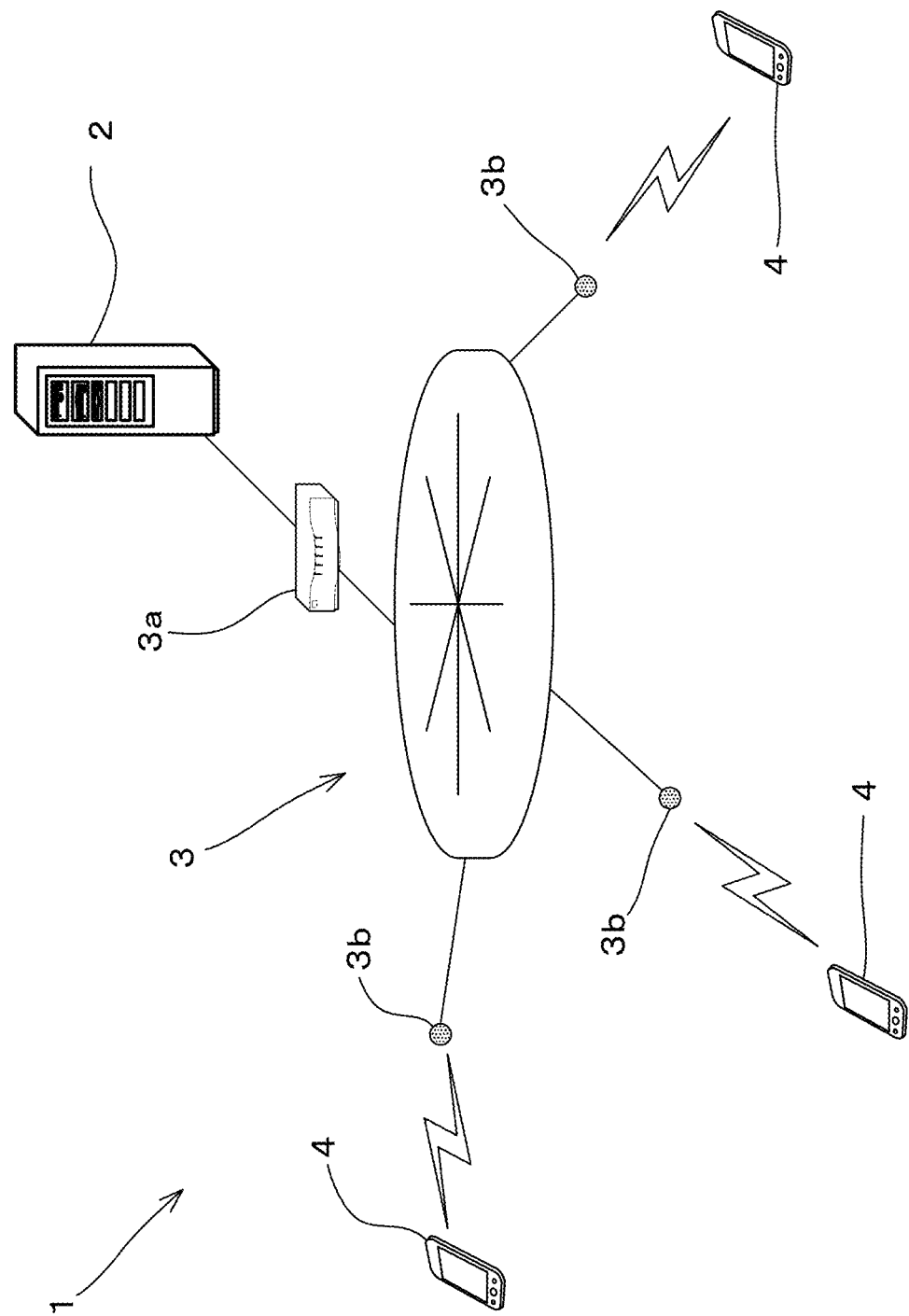
FIG. 1 is a diagram illustrating a schematic configuration of a game system according to an embodiment of the present invention.

Hereinafter, an example of a game system according to one embodiment of the present invention will be described. First, referring to FIG. 1, an overall configuration of the game system according to one embodiment of the present invention will be described. The game system 1 includes a center server 2 as a server device. Incidentally, the center server 2 may be configured as one logical server device, which is a combination of server units as a plurality of computer devices. Alternatively, the center server 2 may be logically configured using cloud computing technologies.

The center server 2 is connected to a plurality of user terminal devices 4 as client devices that can be connected via the network 3. The user terminal devices 4 are computer devices that can be connected to the network and are used for personal use by the users. The user terminal devices 4 are capable of providing the users with various services provided by the center server 2 as various computer software is implemented in the user terminal devices 4. Specifically, the user terminal devices 4 provide paid or free games as one of such services. In other words, the user terminal devices 4 function as game machines through software for the games. For example, a desktop or notebook personal computer (hereinafter referred to as a PC), or a mobile terminal device such as a mobile phone (including a smartphone) may be used as each of the user terminal devices 4. Besides, various computer devices such as desktop home game machines, portable game machines, portable tablet terminals, that can be connected to the network and used for user personal use, may be used as the user terminal devices 4.

The network 3 may be configured appropriately as long as it is capable of connecting the user terminal devices 4 to the center server 2. As an example, the network 3 is configured to use the TCP/IP protocol to establish network communication. Typically, the network 3 is configured by combining the internet as a WAN with an intranet as a LAN. In the example in FIG. 1, the center server 2 is connected to the network 3 via a router 3a and the user terminal devices 4 are connected to the network 3 via access points 3b, respectively. Incidentally, the network 3 is not limited to a network that uses the TCP/IP protocol. Various types of network such as wired communication lines or wireless communication lines or the like (including infrared communication, near field wireless communication or the like) may be used as the network 3.

The center server 2 provides various web services to the users of the user terminal devices 4 via the network 3. The web services include game services for making the user terminal devices 4 may provide games (function as the game machines). Incidentally, the web services include services such as a game information service which provides various information about the games, a distribution service which distributes various data or software (including updates of data or the like) to each of the user terminal devices 4, a community service which provides a place for user interaction such as information transmission, exchange and sharing, and a service that assigns the users user IDs to identify the users, respectively.

Figure 2:
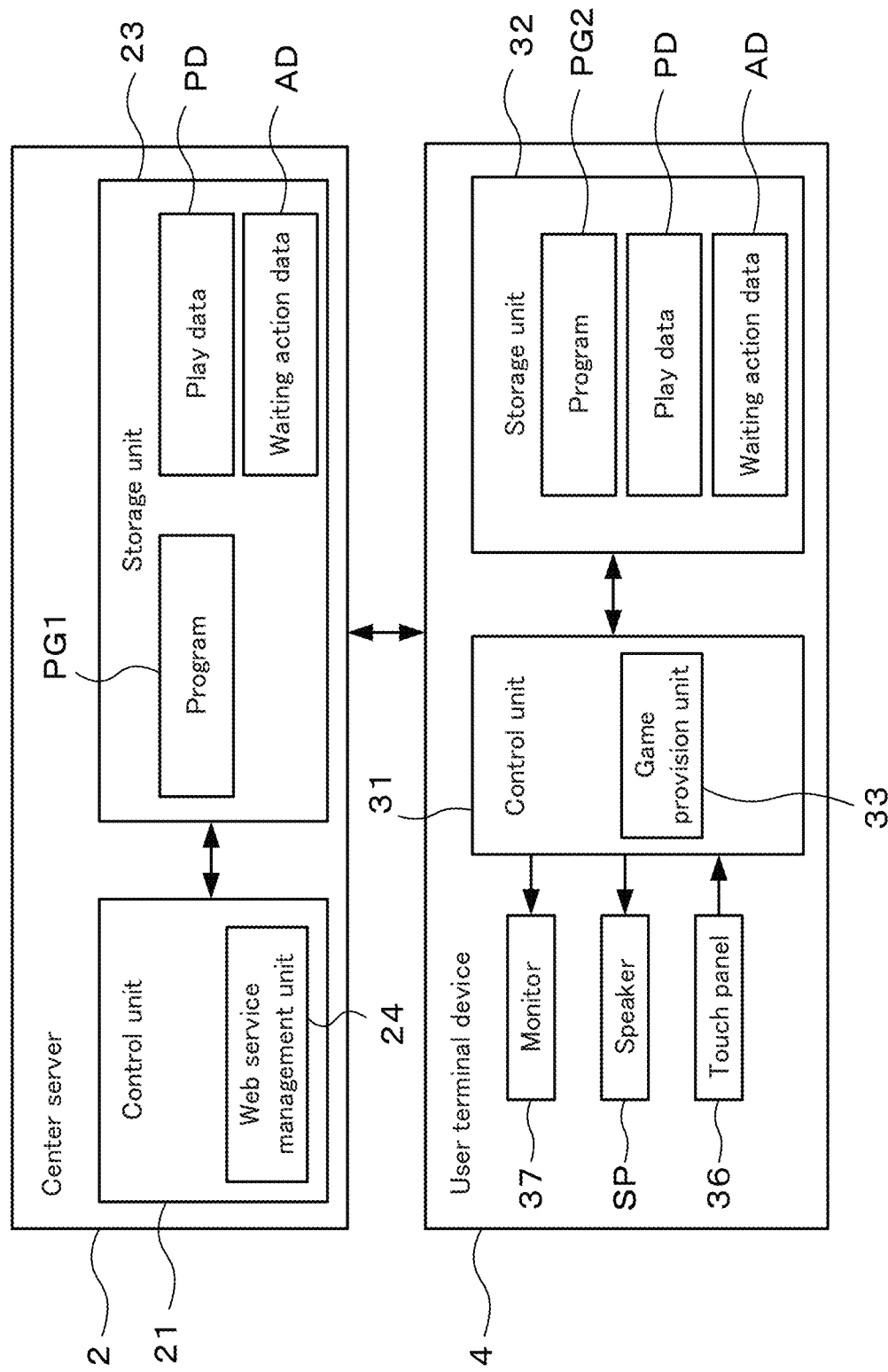
FIG. 2 is a functional block diagram illustrating a main part of a control system of the game system.

Next, the main part of the control system of the game system 1 will be described with reference to FIG. 2. First, the center server 2 includes a control unit 21 and a storage unit 23 as a storage device. The control unit 21 is configured as a computer, which is a combination of a CPU as an example of a processor that executes various arithmetic processing and operation control in accordance with a predetermined computer program, and an internal memory and other peripheral devices necessary for its operation. The storage unit 23 is an external storage device realized by a storage unit including a non-volatile storage medium (a computer-readable storage medium) such as a hard disk array or the like. The storage unit 23 may be configured to hold all data on a single storage unit, or may be configured to store data in a plurality of storage units in a distributed manner. The storage unit 23 records the program PG1 as an example of a computer program that causes the control unit 21 to perform various processes necessary to provide various services, including the game services, to the user. The storage unit 23 also records data for the server necessary to provide various services. In the example of FIG. 2, play data PD and waiting action data AD are shown as a part of the data recorded in the storage unit 23. The play data PD is data in which information regarding the past play results of each user is described. The play data PD is used to transfer the previous play results (past results) to the next and subsequent plays, or to transfer the settings unique to each user. The characters owned by the respective users, as will be described below, are also managed by the play data PD. Details of the waiting action data AD will be described later.

The control unit 21 has a web service management unit 24 as a logical device realized by the combination of hardware resources of the control unit 21 and the program PG1 as a software resource. The web service management unit 24 performs various processes to realize the above-described game services. These various processes include processing for providing play data PD and waiting action data AD to the user terminal devices 4. In addition, a waiting character placement process, a waiting action control process, and a moving action control process are also included in the above-mentioned various processes. The procedures of the waiting character placement process, the waiting action control process, and the moving action control process will be described below. Incidentally, the input device such as a keyboard or the like, the output device such as a monitor or the like may be connected to the control unit 21 as necessary. The input device and the output device are not shown in the drawings. The web service management unit 24 may also provide the play data PD and the waiting action data AD to the user terminal devices 4 as a part of the distribution service. Furthermore, if the waiting character placement process, the waiting action control process, and the moving action control process, as described below, are performed on the user terminal devices 4, such a distribution service may function as the game service.

Each of the user terminal devices 4, on the other hand, includes a control unit 31 and a storage unit 32 as a storage device. The control unit 31 is configured as a computer, which is a combination of a CPU as an example of a processor that executes various arithmetic processing and operation control in accordance with a predetermined computer program, and an internal memory and other peripheral devices necessary for its operation. The control unit 31 has a game provision unit 33 as a logical device realized by a combination of the hardware resources of the control unit 31 and the program PG2 as a software resource. The game provision unit 33 executes various processes necessary to enjoy the game service provided by the web service management unit 24 of the center server 2.

The storage unit 32 is an external storage unit realized by a storage unit including a non-volatile storage medium (computer-readable storage medium) such as a hard disk or a semiconductor storage device. The storage unit 32 records terminal data necessary for providing various services together with the program PG2. In the example of FIG. 2, the play data PD and the waiting action data AD are shown as a part of such terminal data. The play data PD and the waiting action data AD are provided by the center server 2. Incidentally, the terminal data also includes other game data (the play data PD and the waiting action data AD may serve as a part of the game data) necessary to allow the user to play a predetermined game in accordance with the program PG2. For example, the game data includes image data for displaying various images for the game, or BGM data for replaying (reproducing) various BGM. Such game data are not shown in the drawings.

Each of the user terminal devices 4 has input and output devices such as a touch panel 36 as the input device that outputs signals corresponding to the user touch operations (finger touching operations), a monitor 37 as one of the output devices (display device) for presenting the game screen or the like to the user, and a speaker SP as another output device for reproducing sound. Incidentally, the user terminal devices 4 may be equipped with various other input and output devices, such as a gyro sensor, an accelerometer, a positional information (for example, GPS information) receiver or the like, for example.

Next, the games provided by the user terminal devices 4 through the game service will be described. The user terminal devices 4 can provide various games through the game service. As an example, FIG. 3 to FIG. 13 are referred to in order to describe a case in which the user terminal devices provide an idol training game. The training game is a game in which a character (not limited to an object having a personality, but also including various objects such as cars and animals or the like) is trained, and is classified into various types in accordance with the characters to be trained. Among various types of training game, an idol training game belongs to the type of games in which an idol is trained. Specifically, the user of the idol training game plays the role of a producer who produces idols, and for example, collects female characters to organize an idol team. In the game, the user improves the skills and levels and increases fans of each character (or team) (the number of fans may be used as the basis for each character's level or the like) by having the idol team or each character (idol) gain various experiences. In addition, various events such as live performances are used as elements to increase the experience point of each character. For example, the live events may be configured as so-called music games, and these events may be organized as different games of various types. Also, the results of these different kinds of games (for example, scores or the like) may influence the growth of each character. Similarly, in addition to such events for training, for example, various factors such as conversations with each character, frequency of use or the like (the more frequent the conversations, the higher the growth rate) may be used as factors affecting the training.

In order to perform the above-mentioned training, in the idol training game, each user is first given an acquisition opportunity to acquire one character. In the acquisition opportunity, each user is given the character through the lottery (including a so-called Gacha) (Incidentally, the acquisition opportunity is not limited to the above-mentioned opportunity, and one character may be given to the user based on appropriate conditions such as a user choice or various game results or the like). Such an acquisition opportunity may be given to each user equally when playing the game for the first time, or may be given to users as appropriate depending on acquisition conditions (for example, play situations of the game or various events or the like). For example, the acquisition condition may include payment of the consideration as a requirement and may be satisfied when the predetermined consideration is paid after the operation for requesting the acquisition opportunity. In other words, the acquisition opportunity may be provided in return for a fee as appropriate upon the user request.

Figure 3:
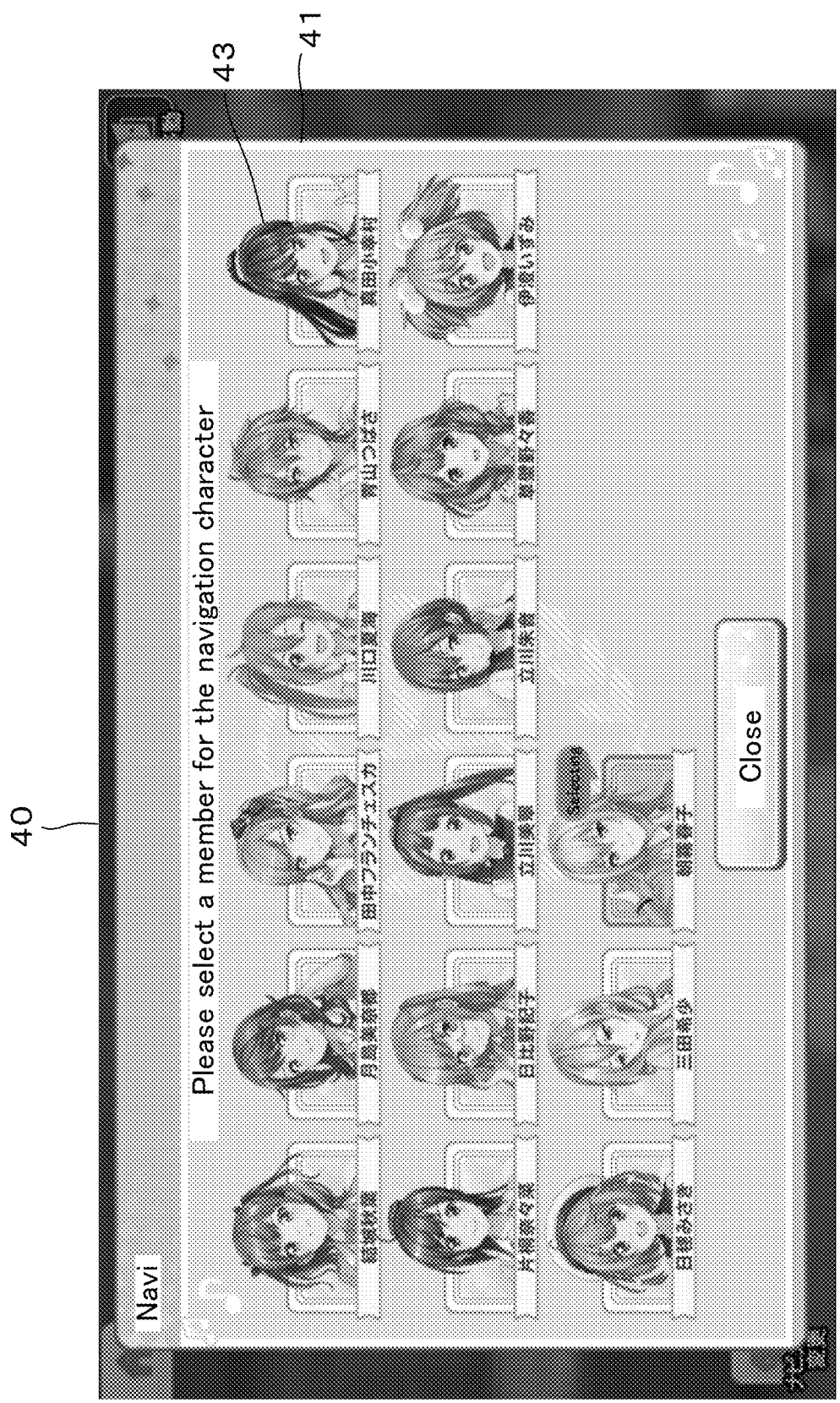
FIG. 3 is a diagram illustrating an example of a character selection screen.

FIG. 3 illustrates an example of a character selection screen for selecting a facilitator character from a plurality of characters acquired through the acquisition opportunity. The character selection screen functions as a part of the game screen used to play the idol training game. The facilitator character is a character that assists in the progress of the game as it intervenes between the game and the user. As shown in FIG. 3, a character selection screen 40 includes a training character region 41. In the training character region 41, displayed are character images 43, which function as images of respective characters. In other words, a plurality of character images 43 corresponding to a plurality of characters to be trained (a plurality of characters acquired through acquisition opportunities) are displayed in the training character region 41. In the character selection screen 40, one character is selected as the facilitator character from among these character images 43 and appears in subsequent game screens.

In the example of FIG. 3, fifteen character images 43 corresponding to the fifteen characters respectively are displayed in the training character region 41. In other words, fifteen characters are owned by a user as characters to be trained. As each character image 43, a character image 43 showing the head of each character is displayed. In other words, in the training character region 41, the character image 43 showing a part of each character is displayed. Of the characters, the rightmost character image 43 in the lowest row (a character named "ASAGIRI Haruko") is selected as the facilitator. In this case, this character image 43 is displayed on subsequent game screens as the facilitator as appropriate. In this example, for example, fifteen character images 43 corresponding to the fifteen characters respectively function as a plurality of candidate characters for selection. In addition, the rightmost character image in the lowest row 43 (navigation character image 43A; will be described later), which is selected as the facilitator character, functions as a selection character. Incidentally, in the example in FIG. 3, no duplicate character image 43 is displayed, but duplicate possession of the same character may be allowed.

Figure 4:
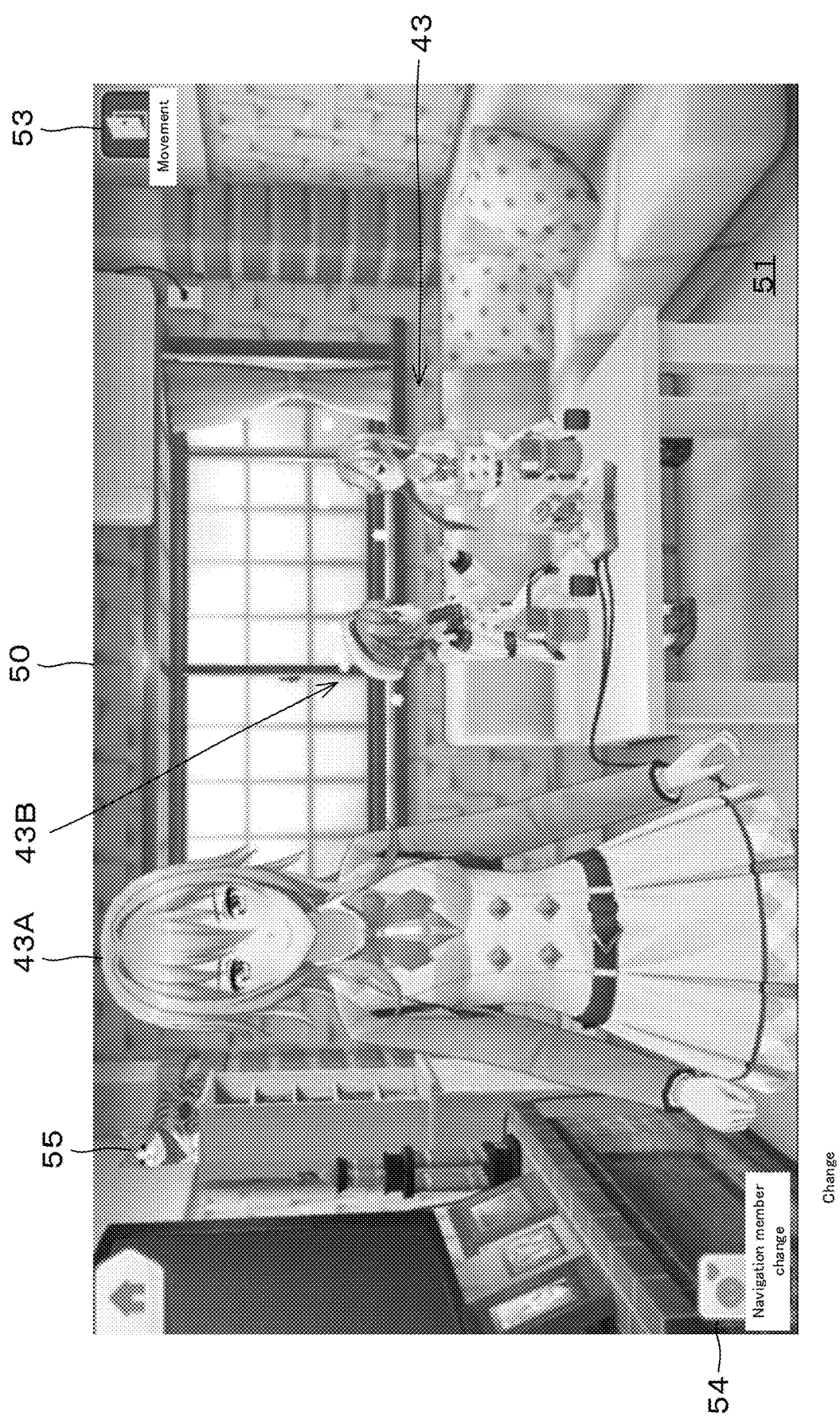
FIG. 4 is a diagram illustrating an example of a room screen that functions as a part of a game screen.

FIG. 4 shows an example of a room screen that functions as a part of the game screen. As described above, various game elements (which may be referred to as functions, modes or progressions), such as live performances, practice for the live performances or conversations with each character, are available for play targets in the idol training game. There are also various game fields that will be the stages for game elements. The room screen is the game screen used for selecting (switching) one or more these game elements, game fields or the like, game fields or the like, and for selecting one or more management functions from various management functions (calling up a help screen for various functions and various management screens such as the character selection screen 40 or the like). In other words, the room screen is a basic game screen for progressing the idol training game and has a function as a so-called home screen for selecting one of several progressions with different purposes.

As shown in FIG. 4, the room screen 50 includes a field area 51, a movement icon 53, and a navigation member change icon 54. The field area 51 is an area for displaying the game field. A virtual three-dimensional space is used as the game field, and a two-dimensional image corresponding to the result of the shooting is displayed in the field area 51. In other words, the room screen 50 is displayed to produce the game field constructed as a virtual three-dimensional space through the field area 51.

In some cases, the character to be trained may be placed in the game field. In such cases, the field area 51 includes the character image 43 (a two-dimensional image that produces a character in a virtual three-dimensional space). When a plurality of characters to be trained are placed in the game field, these characters include a navigation character as a facilitator character and waiting characters in the room screen 50. In other words, these characters are classified into at least two categories. In such a case, the character images 43 in the field area 51 include a navigation character image 43A corresponding to the navigation character and waiting character images 43B corresponding to the waiting characters.

The navigation character is a character that functions as a navigator in the room screen 50. Specifically, the navigation character executes progress guidance or the like including selection of various progresses. The navigation character is selected by the user from the characters (for example, characters to be trained) owned by the user. On the other hand, the waiting character(s) is a character that is automatically selected from the characters owned by the user, appears randomly in the game field, and automatically performs waiting actions there. Therefore, the waiting character is not directly related to the progress of the game and does not require any operation by the user. Such waiting actions include joint actions based on the number of the waiting characters. The joint action is an action that is performed by a plurality of waiting characters that collaborate with each other. For this reason, the joint action is executed by two of them when there are two waiting characters, and by three of them when there are three waiting characters. In other words, various actions are prepared as the joint actions, depending on the number of the waiting characters.

Incidentally, the joint action may not be executed by all waiting characters. In other words, the joint action may be executed by some of the waiting characters. Thus, an action executed by two of the three waiting characters may be referred to as the joint action, and a no-joint action (independent action) executed by one of the three waiting characters may be referred to as a waiting action, respectively. The appearance of the waiting character is not limited to the random appearance. For example, the waiting character(s) may appear based on various conditions for appearance, such as the play situations, a selection result of the user or the like. The waiting character(s) may not be limited to a character(s) owned by the user, but may be a character(s) that the user does not yet own, or may be selected from all the characters regardless of being owned by the user. Alternatively, the appearance condition may include an admission condition to determine whether or not the character can appear and a target condition to determine the object of the appearance. Specifically, for example, the admission condition may be satisfied every time in the room screen 50, and a waiting character to appear therein may be randomly determined based on the target condition. Alternatively, the admission condition may be satisfied based on the play situations or the like, and then the waiting character to appear may be randomly determined based on the target condition, or the waiting character to appear may be determined based on the play situations or the like. Similarly, the waiting character may be displayed on the room screen 50 from the beginning (when the screen begins to be displayed) or may be displayed on the room screen 50 some time after the displaying of the screen. If the waiting character appears some time after the displaying of the room screen, the waiting character may perform an action from appearance on the room screen 50 to waiting or exiting (disappearance) as a part of the waiting action. In such a case, a plurality of positions may be prepared as appearance positions or exit positions, from which the actual appearance positions or the like may be determined appropriately depending on various selection conditions (the play situations, randomness, selection results of the user or the like). Similarly, various conditions such as randomness, the play situations (including the elapse of a predetermined amount of time), or the selection result of the user or the like may be used as exit conditions when the waiting character exits before the game finishes. Furthermore, the navigation character may also perform the same waiting action as the waiting character depending on various waiting conditions such as randomness, the play situations (including the elapse of a predetermined amount of time), or the selection result of the user.

On the other hand, the movement icon 53 and the navigation member change icon 54 are both images that function as virtual push buttons upon the touch operation. Specifically, the movement icon 53 is an image used to move each character from the current game field to another game field upon the touch operation. In other words, the movement icon 53 is used to change the game field. The navigation member change icon 54 is an image for changing the current navigation character to another character to be trained upon the touch operation. Specifically, when the navigation member change icon 54 is touched, the character selection screen 40 is displayed. Then, as described above, the navigation character is selected through such character selection screen 40, and if the selected navigation character is different from the current navigation character, the current navigation character is replaced by the selected navigation character. For example, if a waiting character is selected for change through the character selection screen 40, the navigation character is replaced by the waiting character. Thus, the waiting character also functions as a replacement personnel for the navigation character. Incidentally, the setting of the navigation character is not limited to the replacement instruction based on the navigation member change icon 54 or selection on the management screen, but may be performed in different manners as appropriate. For example, when no navigation character is selected, a movement instruction which will be described later may function as a setting of the navigation character. In other words, the method of setting the navigation character may change depending on the situation. The same is true for replacement between the navigation character and the waiting character. For example, if the waiting character is positioned at a guide position which will be described below, such replacement may be accomplished by the touch operation on the waiting character (waiting character image 43B) at that position.

In the example of FIG. 4, in the field area 51, the navigation character image 43A is displayed large on the front side. The field area 51 shows a case in which the navigation character is positioned near the virtual camera so that there is no obstruction to the view between the virtual camera (corresponding to the user viewpoint) and the navigation character in the game field. The navigation character executes various kinds of guidance in such an arrangement where it is predominantly conscious in the user field of view. On the other hand, two waiting character images 43B are displayed in the field area 51. In other words, two waiting characters are arranged in the game field. These two waiting characters are performing conversations with each other in the game field. There are also effects added around the two waiting characters image 43B that create (show) the fun of this conversation. As a result, a chatting by the two waiting characters is represented through the two waiting character images 43B. In other words, the chatting is realized as the joint action by the two waiting characters. Furthermore, the field area 51 also includes a cat image 55 as one of the NPCs (non-player characters). In this case, various effects (for example, a cat meows, an item drops or the like) may be generated by the touch operation on such cat image 55.

Incidentally, the NPCs may include not only animals such as the cat described above, but also human being and things (for example, things that perform various actions such as a robot vacuum cleaner or a car). Alternatively, object images that do not perform various actions, such as a game machine or a plastic bottle, may have the same effects as the NPCs. The game field in the room screen 50 is not limited to an indoor location, but may be outdoors. Similarly, the time of the game field may be set to be linked to real time or the weather. That is, if it is nighttime in real time, the game field may also be set to nighttime, and if it is raining in real space, the game field may also be set to rain. The link to real time may be achieved, for example, by referring to the time information possessed by the terminal device 4. The link to the weather may be realized, for example, by receiving weather information from a weather company. The same is true for locations used as the game fields. Specifically, the ocean may be used as the game field if the user is in the ocean in the real world (space), and a foreign country may be used as the game field if the user is abroad in the real world. Such a link may be achieved by referring to the location information of the terminal device 4, for example, GPS information. The costumes of each character may also be altered depending on the game field. For example, each character may wear a school uniform if the game field corresponds to a classroom, and may wear a lesson outfit if the game field corresponds to a lesson field. On the other hand, the position of the virtual camera in the room screen 50 may be fixed or variable (including cases where it is switched between multiple virtual cameras). Similarly, the shooting direction of such a virtual camera may be fixed or variable. If variable, it may vary under appropriate conditions. For example, the shooting direction may be changed by the user touch operation (the position of the virtual camera may also be changed by the user touch operation).

Specifically, for example, the shooting direction of the virtual camera may change in the left and right directions when a sliding operation is performed by sliding a finger on the screen in the left and right directions, and may change in the up and down directions when a finger sliding operation is performed in the up and down directions. On the other hand, a restriction may be applied to the shooting direction, e.g., not displaying the virtual three-dimensional space behind the user.

In the room screen 50, when the specific instruction to specify the waiting character is executed, the waiting character performs the specific action indicating that the specific instruction has been executed. This applies equally when the waiting character is executing an independent action as the waiting action and when the waiting characters are executing the joint action. Specifically, when the touch operation is executed on the waiting character image 43B as such the specific instruction, the waiting character image 43B, on which the touch operation is executed, executes a motion (action) such that the waiting character image 43B turns its line of sight toward the virtual camera. In other words, the waiting character image 43B executes an action that reacts to the touch operation (line of sight) as the specific action in accordance with the touch operation (for example, an example of an operation indicating the line of sight of the user).

Figure 5:
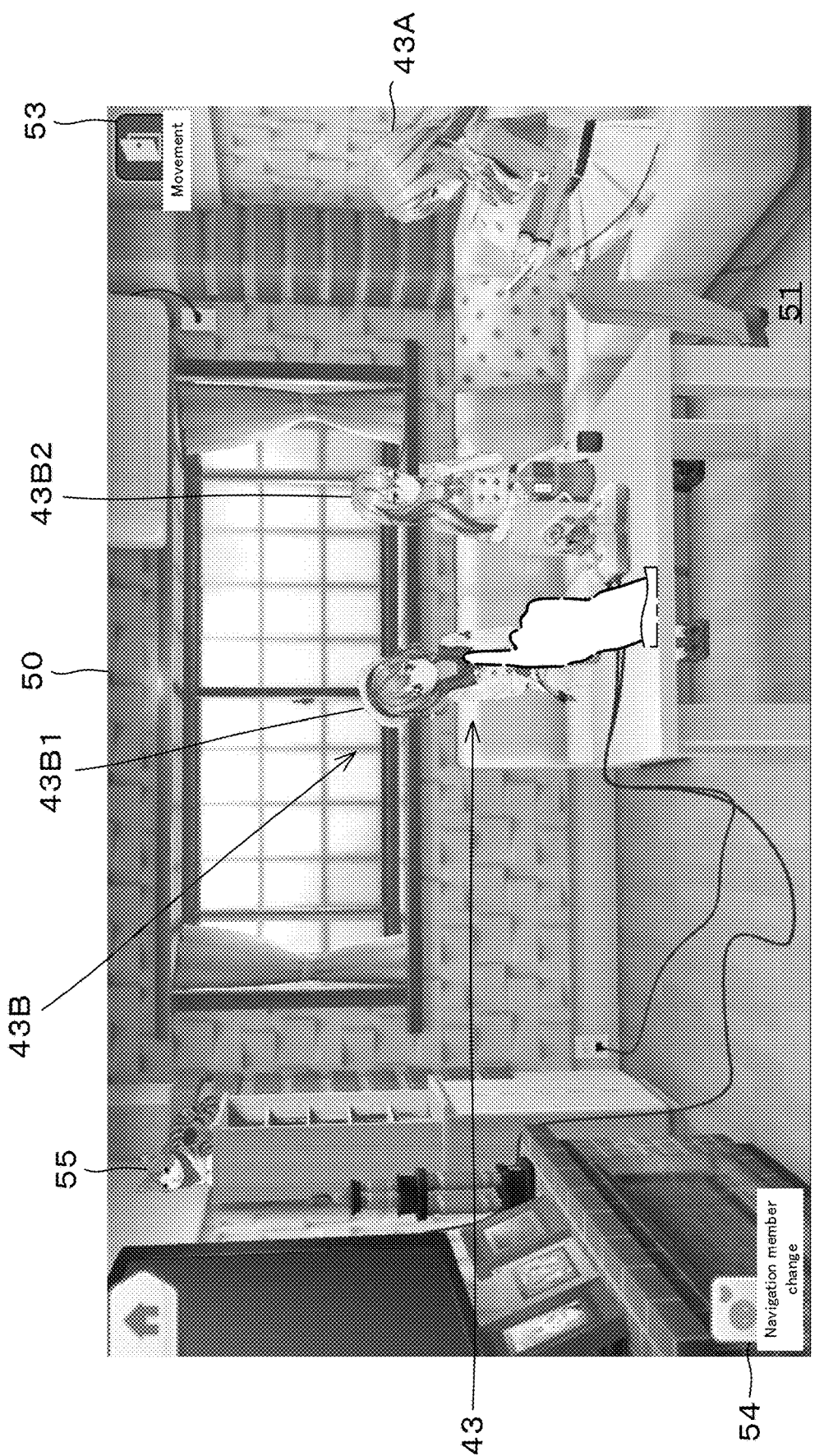
FIG. 5 is an explanatory figure for explanation of a specific action on the room screen.

FIG. 5 is an explanatory figure for explanation of the specific action in the room screen 50. The example in FIG. 5 shows a case in which one of the waiting character images 43B is touched in the room screen 50 of the example in FIG. 4. As shown in FIG. 5, for example, when the touch operation is executed on a waiting character images 43B1 on the left side of the two waiting character images 43B in the example of FIG. 4, the waiting character image 43B1 on the left side stops chatting (joint action) with a waiting character image 43B2 on the right side and performs the specific action to turn its line of sight (turn around) toward the virtual camera. On the other hand, the waiting character image 43B2 on the right side shifts to the independent action after the specific action is started by the waiting character image 43B1 on the left side. In other words, the waiting character image 43B2 on the right side also stops the joint action and starts the independent action that can be performed by a single person, just as a natural action similar to that of a person in reality. More specifically, the waiting character image 43B2 on the right side is looking at (or touching) the mobile phone alone as the independent action. Thus, with the specific instruction to one of the two waiting characters, one of them changes its action from the joint action to the specific action, and the other (the remaining waiting character) changes its action from the joint action to the independent action. The example in FIG. 5 shows a case in which the navigation character image 43A also performs the waiting action in the same way as the waiting character image 43B. In this case, when the specific instruction is given to the navigation character image 43A, the navigation character image 43A also performs the specific action in the same way as the waiting character Image 43B. In other words, during the waiting action, the navigation character is treated in the same way as the waiting character. Incidentally, the specific action is not limited to directing the line of sight toward the virtual camera. As long as the execution of the touch operation (the specific instruction) by the user can be recognized, any appropriate action may be executed as the specific action.

Figure 6:
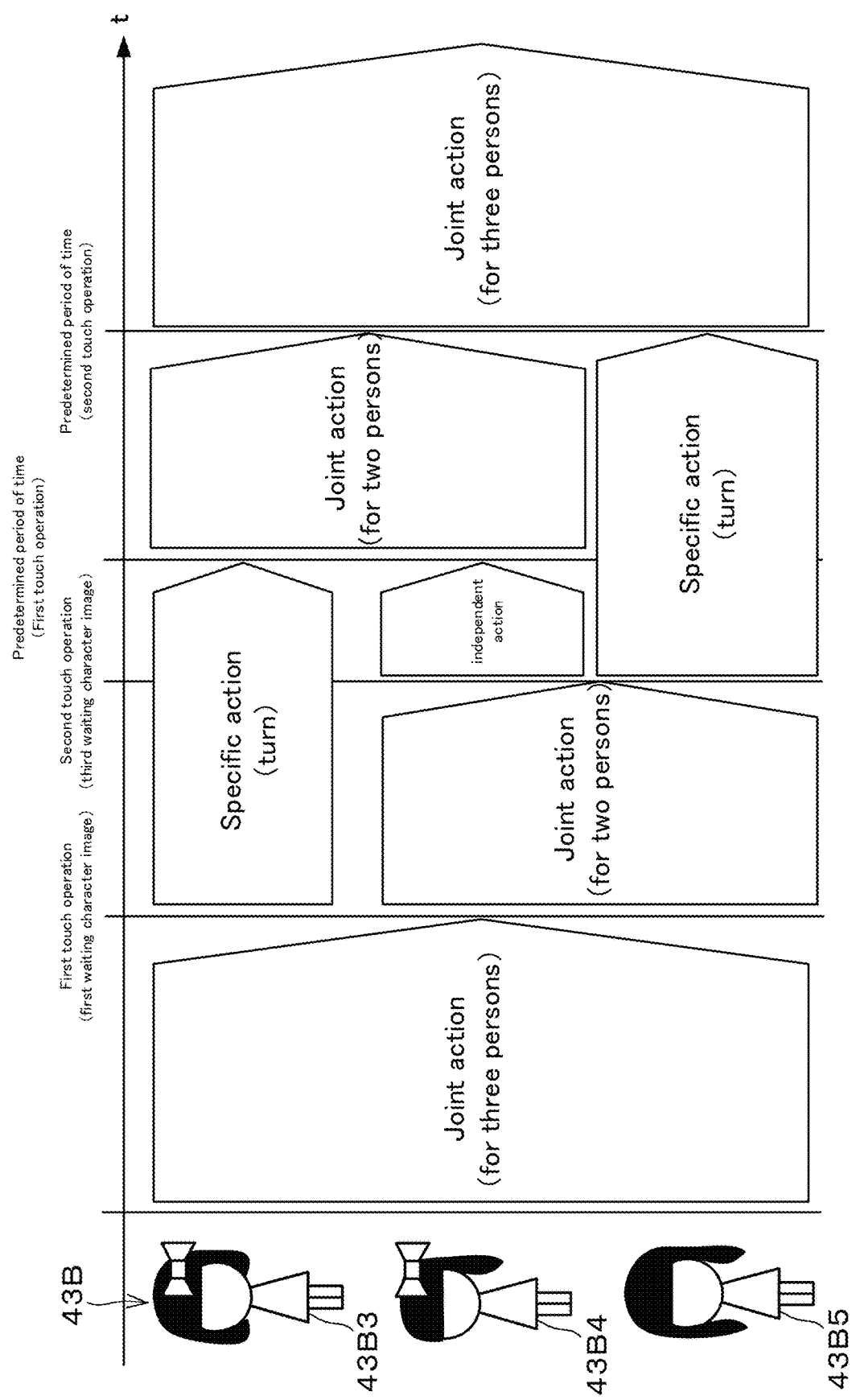
FIG. 6 is an explanatory figure for explanation of the relationship between specific actions and actions of each waiting character image.

Referring to FIG. 6, the relationship between the specific action and the rest of the waiting character(s) is further described. FIG. 6 is an explanatory figure for explanation of the relationship between the specific actions and the actions of each waiting character image 43B. The example in FIG. 6 shows a case where the number of waiting characters is three. In this case, as shown in FIG. 6, the three waiting character images 43B corresponding to the three waiting characters, respectively, first perform the joint action (joint action for three persons) that is shared by the three persons. In this state, when the specific instruction is executed on the first waiting character image 43B3, i.e., when the touch operation (hereinafter occasionally referred to as a first touch operation in the explanation of FIG. 6) is executed on the first waiting character image 43B3, the action of the first waiting character image 43B3 changes from the joint action to the specific action of directing the line of sight to the user (turning toward the user). The first waiting character image 43B3 then continues the specific action for a predetermined period of time.

On the other hand, as the first waiting character image 43B3 begins to perform the specific action, the remaining two waiting character images 43B4 and 43B5 change to the joint action (joint action for two persons) that is shared by the remaining two waiting characters. If further specific instruction, for example, the touch operation (hereinafter occasionally referred to as a second touch operation in the explanation of FIG. 6), is performed on the third waiting character image 43B5 in this situation, the third waiting character image 43B5 also starts the specific action. Thus, as the specific action of the third waiting character image 43B5 begins, the remaining second waiting character image 43B4 loses its partner to perform the joint action so that the character image 43B4 starts an independent action thereafter. On the other hand, when a predetermined period of time has elapsed since the first touch operation, the first waiting character image 43B3 ends the specific action. In other words, after a predetermined period of time has elapsed from the first touch operation, the second waiting character image 43B4 is able to find a partner to perform the joint action again. Therefore, after the predetermined period of time has elapsed from the first touch operation, the first waiting character image 43B3 (the waiting character who is released from the specific instruction) and the second waiting character image 43B4 start the joint action (joint action for two persons) that is shared by two persons. Also, after the predetermined period of time has elapsed from the second touch operation, the instruction to the third waiting character image 43B5 is also released, and the third waiting character image 43B5 ends the specific action. Thus, after the predetermined period of time has elapsed from the second touch operation, the joint action (joint action for three persons) is again executed by the three persons. When the specific instruction is executed in this manner, the remaining waiting characters, other than the waiting character subject to the specific instruction, perform the appropriate action in accordance with the number of characters as the action to be performed after the character subject to the specific instruction leaves the joint action. The remaining waiting characters execute waiting actions in such a way that the joint actions are prioritized over independent actions. In this example, for example, the first waiting character image 43B3 to the third waiting character image 43B5 function as two or more selection candidate characters. Similarly, among them, the first waiting character image 43B3 functions as a one character and a specific character, and the second waiting character image 43B4 and third waiting character image 43B5 function as the remaining selection candidate characters.

Incidentally, such a change in the action of the waiting character is not limited to the case where the specific action is executed, but may be appropriately applied as the number of the waiting characters changes, such as when the moving action is executed as will be described below. The joint action may not take precedence over the independent action. For example, the waiting action of the remaining waiting characters for the specific action may be determined at random, or may be determined based on the play situations or the selection result of the user. Thus, when one waiting character starts the specific action, all of the remaining waiting characters may start independent actions, respectively, or some of them may start the joint action. Whether or not to perform the joint action may be determined based on a joint action condition (for example, a condition that uses a lottery result, the play situations, or the selection result of the user) for determining it. Various appropriate actions, not limited to conversation, may be employed as the joint actions. Such actions may include actions involving the NPC, such as the cat image 55 or the like, for example. Such an action involving the NPC (for example, petting the cat image 55 with a single or with a plurality of waiting characters) may be performed as an independent action or as the joint action. Furthermore, if a plurality of the joint actions suitable for a number of the players are prepared as the joint actions, the joint action to be actually performed may be selected randomly from among the joint action candidates or may be determined depending on the play situations or the selection result of the user. On the other hand, as the independent action associated with the specific action, there may be a dedicated action prepared only when a partner executing the joint action performs the specific action. Specifically, for example, when one of the two persons performing the joint action starts the specific action, the other person may perform the independent action (dedicated action) of "do nothing" that is limited to such a case. Similarly, the dedicated action may be set for the joint action for two persons or the like.

Figure 7:
FIG. 7 is a diagram illustrating a case where three waiting characters are placed in a game field as another example of the room screen.

FIG. 7 shows a case where three waiting characters are arranged in the game field as another example of the room screen 50. The example in FIG. 7 also shows a case where a different game field and waiting characters are used as compared to the example in FIG. 5. In this case, as shown in FIG. 7, three waiting character images 43B corresponding to the three waiting characters, respectively, are displayed in the field area 51. Two of these waiting character images 43B and the remaining one waiting character image 43B are displayed at a distance from each other. In this case, in order not to deviate from the actual action, the two waiting character images 43B, which are located close to each other, perform the joint action, and the single waiting character image 43B, which is located away from the above-mentioned two waiting character images, performs the independent action.

In the example in FIG. 7, the touch operation is performed on one of the two waiting character images 43B (on left side) that are performing the joint action. Therefore, the touched waiting character image 43B turns its line of sight toward the user, while the remaining waiting character image 43B of the two waiting character images 43B, which were performing the joint action, is performing the independent action. Thus, although the waiting character image 43B performing the specific action and two other waiting character images 43B are displayed in the field area 51, the latter two waiting character images 43B do not start the joint action, and both of these two waiting character images 43B are performing the independent actions, respectively. In this way, whether or not to execute the joint action may be determined in accordance with the placement position of the waiting characters (an example of the joint action condition that uses the play situation). Incidentally, in the example of FIG. 7, after the joint action is discontinued, the remaining one waiting character image 43B may move toward the waiting character image 43B that is performing the independent action, and a new joint action may be initiated by these two waiting character images 43B. In other words, based on the joint action conditions, the remaining waiting character image(s) 43B may perform the joint action as appropriate.

The specific action serves as a prerequisite for having each waiting character (including the navigator character who is performing the waiting action) execute a moving action. Such a moving action is executed when the movement instruction is executed to the waiting character who is performing the specific action. Such a movement instruction is realized, for example, by a further touch operation on the waiting character during the specific action. In other words, when the further touch operation is executed on the waiting character whose line of sight is pointed at the user upon the touch operation, the waiting character executes the moving action. In response to such a movement instruction, the waiting character performs the moving action to move to the vicinity of the virtual camera and stand next to the navigation character, as the moving action.

Figure 8:
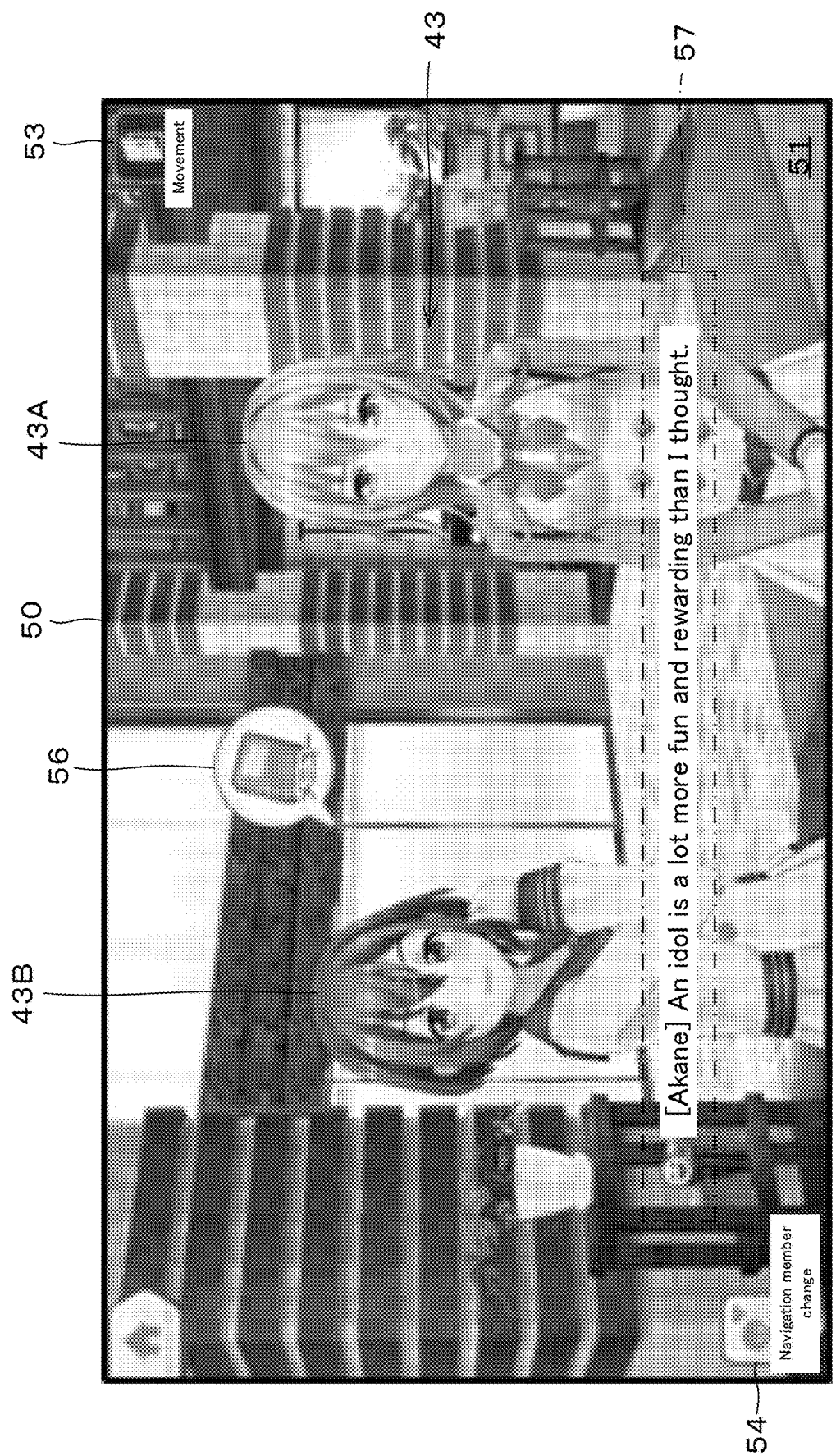
FIG. 8 is a diagram illustrating an example of a room screen when a waiting character is positioned alongside a navigator character as a result of a moving action.

FIG. 8 illustrates an example of the room screen when the waiting character is positioned next to the navigation character as a result of the moving action. The example in FIG. 8 also shows a case in which the movement instruction is executed on the waiting character performing the specific action in the example of FIG. 7. In this case, as shown in FIG. 8, similar to when the navigation character image 43A executes the guidance, the waiting character image 43B is displayed at a larger size in the front area of the screen so that the waiting character image 43B is located near the virtual camera, where no other objects are placed between the waiting character image 43B and the virtual camera. In other words, the waiting character image 43B moves from the back side to the front side in the depth direction in the virtual three-dimensional space and is displayed alongside the navigation character image 43A. In this position, the waiting character image 43B plays the same role as the navigation character image 43A. In other words, a new character that performs the same role as the navigation character is added from the waiting characters. Specifically, when the waiting character image 43B is positioned next to the navigation character image 43A so that it is displayed in a larger size in the front area, the waiting character image 43B performs various types of guidance in the same way as the navigation character image 43A. As a result, the waiting character also functions as an additional person to add a character in the same role as the navigation character.

In the example of FIG. 8, a menu icon 56 pops up from the waiting character image 43B so that the waiting character image 43B functions in the same way as the navigation character image 43A. The menu icon 56 is an image that functions as a virtual push button to present a menu that realizes various functions, which is similar to the movement icon 53 or the like. Then, a menu for switching various functions or calling up the management screen is displayed by the touch operation to the menu icon 56. Incidentally, the menu icon 56 may pops up from the waiting character image 43B under appropriate conditions. For example, the menu icon 56 may be automatically displayed by the waiting character image 43B as the waiting character image 43B is moved to a position alongside the navigation character image 43A. Alternatively, the menu icon 56 may be displayed in conjunction with a predetermined operation such as the touch operation.

In the example of FIG. 8, if the waiting character image 43B is located next to the navigation character image 43A so that the waiting character image 43B is displayed at a larger size in the front area, a chat function is provided to allow to talk with the waiting character. Specifically, a portion of the field area 51 functions as a comment region 57 (the single-dotted line distinguishing the regions is not displayed on the actual room screen 50), and comments from the waiting character image 43B are displayed in the comment region 57. For example, such a chat function is provided when a predetermined operation that wishes to chat is performed on the waiting character image 43B. As such predetermined operation, the touch operation on the waiting character image 43B is employed (for example, it may include other timing conditions such as before the display of the menu icon 56).

Incidentally, the chat function may accept comments from the user so that an actual conversation can take place. Alternatively, the chat function may not accept comments from the user, but may unilaterally provide comments (predetermined words and/or speech) from the waiting character. The waiting character image 43B or the navigation character image 43A may be classified into a plurality of regions, and each region may have a different effect allocated to each region. For example, an effect that pops up the menu icon 56 may be assigned to the region of the head of the waiting character image 43B, and an effect that activates the chat function may be assigned to the region near the mouth. Similarly, an effect to perform a happy action may be assigned to the region of the hand, and an effect to perform an angry action may be assigned to the region around the chest. Further, if an emotion value is set for each character to express an emotion, such an emotion value may change in response to the touch operation to each such region (for example, if the touch operation is made to the region around the chest and the different emotion values are set for joy, anger, sadness, and sorrow, the emotion value corresponding to anger may increase, the emotion value corresponding to grief may increase, or the both may increase). Also, the action associated with the touch operation may change in response to such changes in the emotion value. Specifically, the content of the action may change in multiple stages, such as putting a hand on the waist, lightly hitting, throwing an object or the like, as an angry action. Also, a plurality of candidate actions may be prepared for a plurality of stages respectively in accordance with such emotion values. The actual action (effect) may be selected from such candidate actions by a suitable method such as random selection or the like. On the other hand, the specific action may not be a precondition for the moving action. The specific action may be used for various purposes as an action that indicates a result of the specific instruction. Thus, the specific instruction and the movement instruction may differ from each other regardless of whether or not the specific action is the precondition for the moving action. For example, a double-tap operation (an operation in which the touch operation is quickly repeated twice) may be used as the specific instruction, and a long press (the touch operation that continues for a predetermined time or longer) may be used as the movement instruction. Similarly, various operations in accordance with various input devices may be employed as the specific instruction and the movement instruction.

Figure 9:
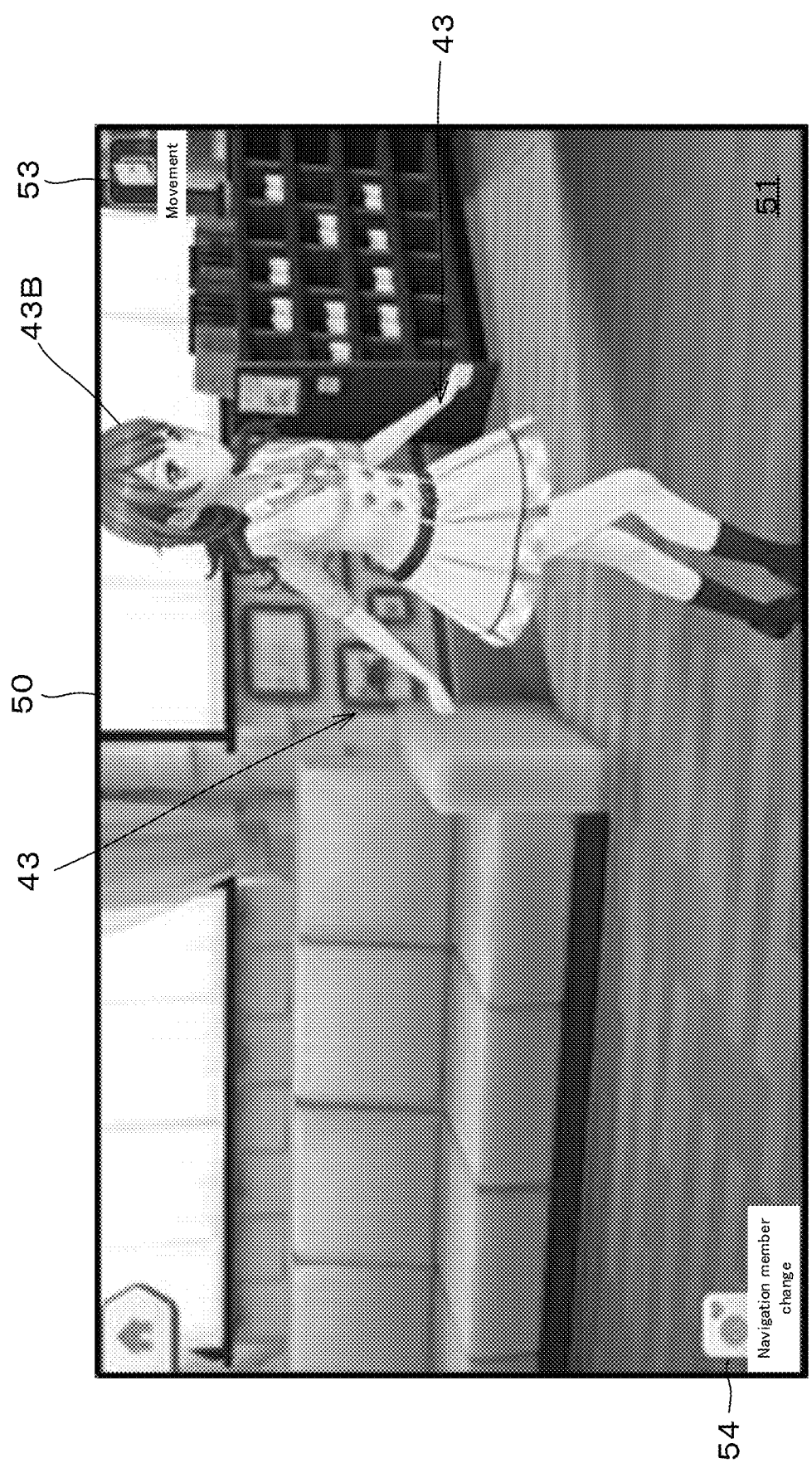
FIG. 9 is a diagram illustrating an example of the room screen when a character image showing a character performing a moving action is displayed in the field region.

FIG. 9 illustrates an example of the room screen 50 when the character image 43 showing the character performing the moving action is displayed in the field area 51. Such a room screen 50 is displayed when each character performs the moving action. More specifically, such room screen 50 is displayed between the room screen 50 of the example in FIG. 7 and the room screen 50 of the example in FIG. 8. In other words, it is displayed when each character moves from the waiting position where it is executing the waiting action to a position where it is displayed at a larger size in the front area (for example, a position close to the virtual camera so as not to include an obstacle). The example in FIG. 9 also shows a case where one waiting character image 43B at the remote position in the example of FIG. 7 executes the moving action. In this case, as shown in FIG. 9, the waiting character image 43B performs a running motion to move to the position of the waiting character image 43B in the room screen 50 in the example of FIG. 8 after standing up at the waiting position from the waiting action sitting on the sofa. In this case, the position and direction of the virtual camera may be different from the position and direction of the virtual camera in the room screen 50 in the example of FIG. 8 (or the example of FIG. 7) in order to express the running motion in a clearer manner. The room screen 50 of the example of FIG. 8 is then displayed after such room screen 50.

Figure 10:
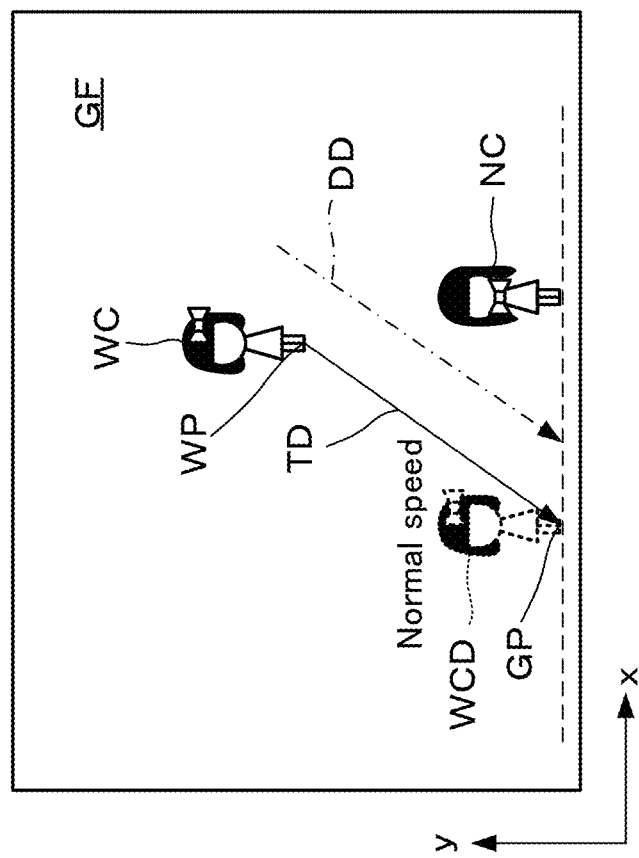
FIG. 10 is an explanatory figure for explanation of positional relationship when the waiting character moves from the waiting position to the guide position at normal speed.

Furthermore, a speed (moving speed) at which each character runs in the example of FIG. 9 changes in accordance with the position relationship between a movement start position (for example, the waiting position) at which the movement starts (for example, the waiting position) and an arrival position to be reached (for example, the position next to the navigation character located near the virtual camera). Referring to FIG. 10 to FIG. 13, an example of the change in the moving speed in accordance with such a position relationship will be described. All of FIG. 10 to FIG. 13 schematically show a case where the game field (virtual three-dimensional space), which is the stage of the room screen 50, is viewed from above. Thus, if the depth direction of the game field of the room screen 50, e.g., the room screen 50 in the example in FIG. 8, is referred to as the y-axis, the left-right direction is referred to as the x-axis, and the height direction is referred to as the z-axis, then the two axes of the x-axis and y-axis are taken out and schematically shown (as a plan view of the x-axis and y-axis). Similarly, FIG. 10 to FIG. 13 all show a case where the waiting character executes the moving action to a position next to the navigation character (hereinafter occasionally referred to as the guide position) upon the movement instruction. More specifically, FIG. 10 is an explanatory figure for explanation of the position relationship when the waiting character moves from the waiting position to the guide position at normal speed. As shown in FIG. 10, when the navigation character NC and the waiting character WC are arranged in separate positions in the game field GF, and the waiting character WC should move to the vicinity of the navigation character NC from its position (waiting position) which is remote from the navigation character, a moving distance TD from the waiting position WP of the waiting character WC to the guide position GP as the arrival position in the x-axis and y-axis of the game field GF is calculated firstly, and if the moving distance TD is less than or equal to a predetermined distance DD (hereinafter occasionally referred to as the threshold distance DD), the normal speed is adopted as the moving speed of the waiting character WC.

Specifically, the positions on the x- and y-axes of the waiting position WP and the guide position GP are first obtained to calculate the moving distance TD. The current (pre-moving) position (location) of the waiting character WC which should perform the moving action functions as the waiting position WP. This position is calculated as coordinates in the x- and y-axes based on a particular reference point that is commonly set for each character, e.g., if an axis line in the height direction is set for each character, a point or the like at which the axis line intersects with the ground of the game field GF is used as the particular reference point. On the other hand, the guide position GP (the position of the waiting character WCD indicated by the dashed line in the example in FIG. 10) is set at the predetermined position in advance. The coordinate of the y-axis and the fixed position on the x-axis where the navigation character NC is located (for example, the position that leaves an interval or space for one character image 43 to enter between the waiting character image 43B and the navigation character image 43A in the room screen 50) is used as such predetermined position so that the waiting character image 43B is arranged at a position aligned with or next to the navigation character image 43A in the room screen 50. Then, the shortest distance that connects the calculated waiting position WP and the guide position GP with a straight line is calculated. The movement of each character is basically executed so as to move the shortest distance. Therefore, this shortest distance is used as the moving distance TD of the waiting character WC. When the shortest distance is shorter than the threshold distance DD, the normal speed is determined as the moving speed of the waiting character WC. In other words, in this case, the waiting character image 43B is displayed on the room screen 50 so that the waiting character WC moves at the normal speed in the example of FIG. 9.

Figure 11:
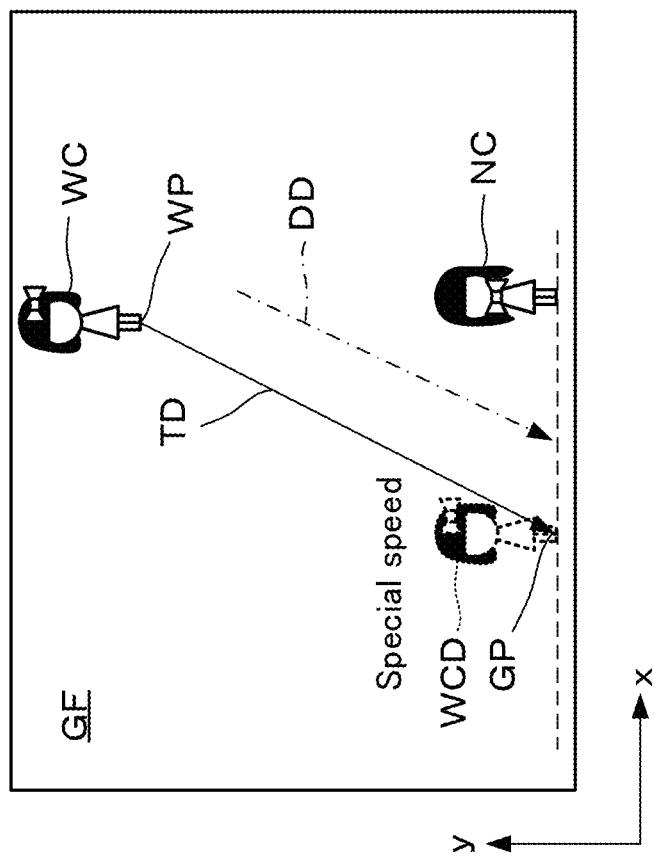
FIG. 11 is an explanatory figure for explanation of a moving speed when a waiting character is located farther than the threshold distance (farther than the example in FIG. 10).
Figure 12:
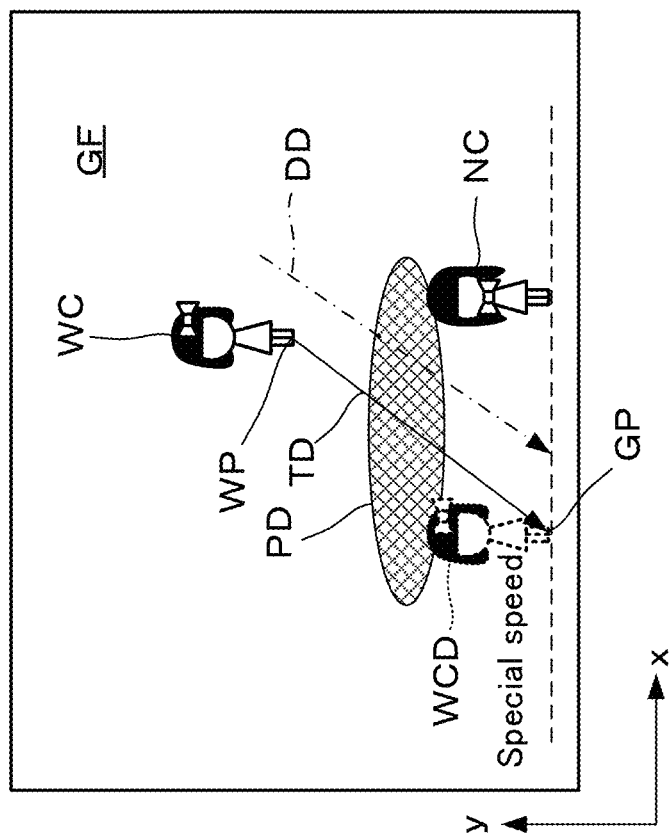
FIG. 12 is an explanatory figure for explanation of a moving speed when there is an obstacle in the movement path of the waiting character.

On the other hand, FIG. 11 and FIG. 12 both show an exemplary case in which the waiting character WC moves at a special speed based on the position relationship between the waiting position WP and the guide position GP. In other words, in the examples of FIG. 11 and FIG. 12, the waiting character image 43B is displayed on the room screen 50 as moving at the special speed in the example of FIG. 9. More specifically, FIG. 11 is an explanatory figure for explanation of the moving speed when the waiting character WC is located farther than the threshold distance DD (farther than the example in FIG. 10). In other words, the example in FIG. 11 shows a case in which the threshold distance DD is used as the position relationship between the waiting position WP and the guide position GP, and the moving speed changes in accordance with the distance. In this case, as shown in FIG. 11, the moving distance TD (calculated as in the example of FIG. 10) of the waiting character WC is longer than the threshold distance DD. Therefore, the moving speed of the waiting character WC is changed to the special speed such that the moving time (travelling time) of the waiting character WC becomes less than a predetermined time. Incidentally, the predetermined time may be set, for example, in accordance with the user's feeing, experience or the like, or may be changed as appropriate in accordance with the actual results or the like.

Similarly, FIG. 12 is an explanatory figure for explanation of the moving speed when there is an obstacle in the movement path of the waiting character WC. In other words, the example in FIG. 12 shows a case in which the presence or absence of the obstacle in the movement process is adopted as the position relationship between the waiting position WP and the guide position GP, and the moving speed changes to the special speed depending on whether or not there is an obstacle in such a movement process. In this case, as shown in FIG. 12, the moving distance TD of the waiting character WC itself is about the same (at least shorter than the threshold distance DD) as in the case of the normal speed in the example of FIG. 10, but if the waiting character WC moves the shortest moving distance TD, the pond PD as the obstacle to the movement (preventing the movement) is formed in the movement process. In this case, the waiting character WC cannot move the shortest distance, and if it were in the real world, it would move along a detour path to avoid obstacles. Therefore, also in this case, the moving speed of the waiting character WC is changed to the special speed that reduces the moving time of the waiting character WC less than the predetermined time. In the examples of FIG. 10 to FIG. 13, the navigation character NC and the waiting character WC function as the guide character and the waiting character, respectively. For example, the three waiting character images 43B in the example of FIG. 7 and one waiting character image 43B at a remote position (waiting character image 43B performing the moving action in the example of FIG. 9) function as a plurality of waiting characters and one waiting character. Incidentally, the predetermined position is not limited to the waiting position. For example, a fixed position other than the waiting position, or an appropriate position that changes depending on various conditions may be used as the predetermined position. Similarly, the arrival position is not limited to the guide position, but the appropriate position may be used as the arrival position.

Figure 13:
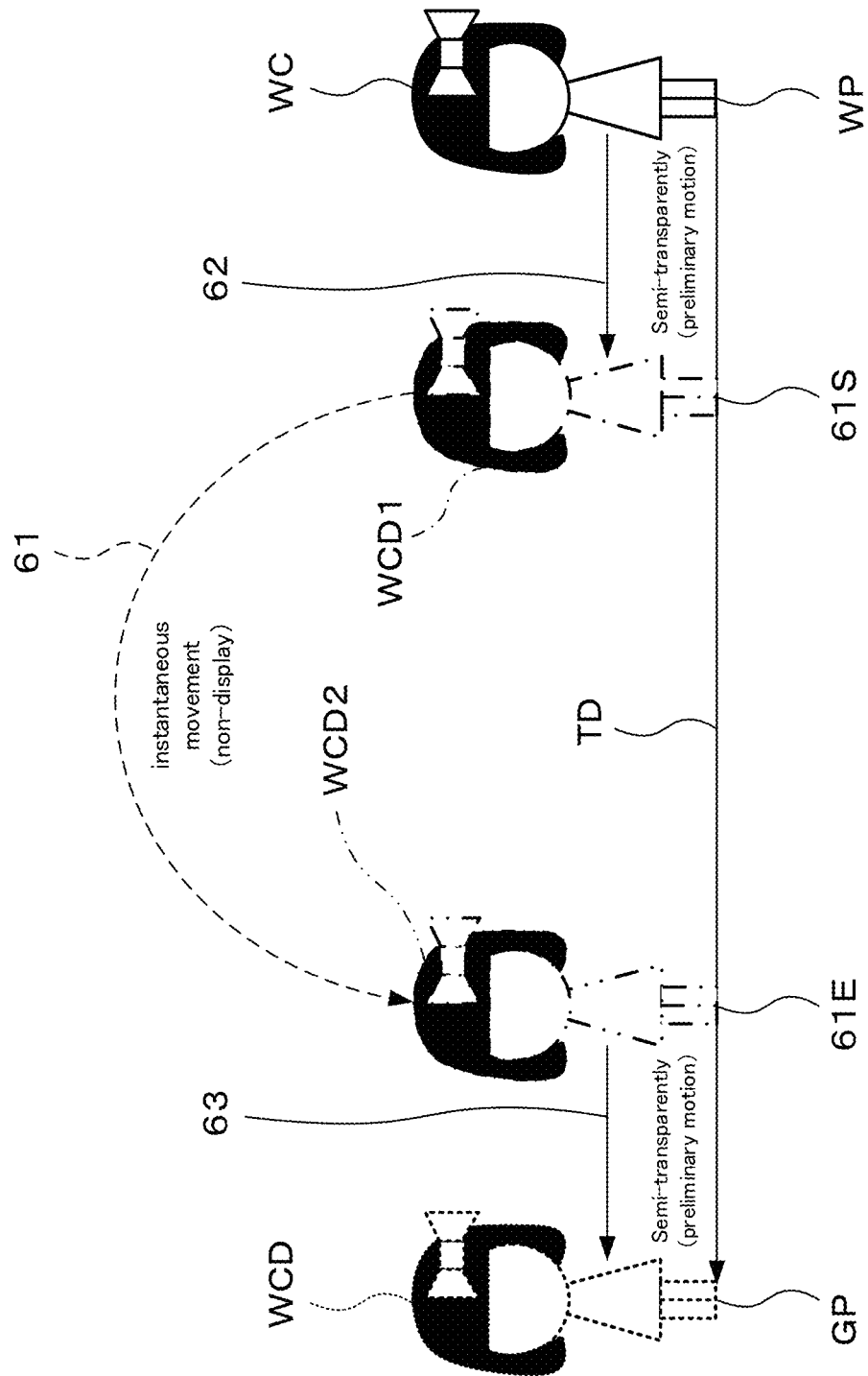
FIG. 13 is an explanatory figure for explanation of an example of a display of each character when it moves at a special speed.

Referring to FIG. 13, the special speed will be further described. FIG. 13 is an explanatory figure for explanation of an example of the display of each character when the character moves at the special speed. The example in FIG. 13 shows an example of the display of the waiting character WC in the example of FIG. 12 when the waiting character WC moves at the special speed. In this case, as shown in FIG. 13, the display of the waiting character image 43B corresponding to the waiting character WC is omitted on the room screen 50 during a part of the movement process of the waiting character WC (corresponding to the moving distance TD where the waiting position WP and the guide position GP serve as the start and end positions, respectively). More specifically, an intermediate portion 61 that does not include the beginning and the end of the movement process (which is conceptually similar to the moving distance TD) is not displayed. Also, in the intermediate portion 61, instantaneous movement is realized. In other words, the waiting character WC becomes a non-display at the beginning position 61S of the intermediate portion 16, and the waiting character is instantaneously located at the end position 61E of the intermediate portion in a moment after the non-display, and then the non-display of the waiting character WC ends.

Also, before and after the intermediate portion 61, i.e., in the first portion 62 of the moving distance TD (from the position of the waiting character WC indicated by the solid line to the position of the waiting character WCD1 indicated by the single-dotted line) and in the last portion 63 of the moving distance TD (from the position of the waiting character WCD2 indicated by the double-dotted line to the position of the waiting character WCD indicated by the dashed line), the waiting character WC performs preliminary motions. Specifically, in the first portion 62 of the moving distance TD, the waiting character WC performs a preliminary motion (hereinafter occasionally referred to as a first preliminary motion) to initiate the moving action. Such a first preliminary motion may include, for example, a standing motion if the character is sitting on a couch and a subsequent running (starting to move) motion. On the other hand, in the last portion 63 of the moving distance TD, the character performs another preliminary motion (hereinafter occasionally referred to as a second preliminary motion) to end the moving action. Such a second preliminary motion may include, for example, a running motion indicating a movement and a stopping motion (braking motion) of such a movement. Furthermore, in the first portion 62 and the last portion 63 of such moving distance TD, the waiting character WC is displayed semi-transparently in order to reduce the unnaturalness of the instantaneous movement. In other words, the waiting character WC undergoes the following processes; starts moving, becomes semi-transparent, moves instantaneously (not displayed), becomes semi-transparent again, and is displayed again. As one example, the special speed involving such an instantaneous movement is utilized. In this example, the intermediate portion 61, the first portion 62, and the last portion 63 correspond to a part of movement process, before the part of the movement process, and after the part of the movement process, respectively.

Incidentally, if the above-described instantaneous movement is used as the special speed, the moving time is constant regardless of the moving distance TD. In addition, the movement of the waiting character WC itself is also omitted partially. Thus, the moving speed is not limited to the speed at which the waiting character WC runs, but may encompass a broad concept obtained by dividing the moving distance TD by the time required from the start of the movement to the end of the movement. On the other hand, while actually moving the waiting character WC at the special speed (a speed that makes the arrival at the arrival position in the predetermined time), the display of a portion of the movement process may be omitted. In other words, the instantaneous movement may not be executed in the intermediate portion 61 in the example of FIG. 13, and only the display during the movement in the intermediate portion 61 may be omitted. In this case, for example, when the obstacle exists in the movement process as in the example of FIG. 12, the waiting character WC may move a shortest distance as in the case where there is no obstacle or may move a predetermined bypass route. Thus, the special speed may change appropriately in accordance with the moving distance TD as long as the arrival at the arrival position is made in the predetermined time. In other words, the special speed may not be constant regardless of the distance, the presence or absence of obstacles or the like, and may change in accordance with the distance and the presence or absence of obstacles. In such a case, the speed of movement in the intermediate portion 61 may differ from the speed of movement in the semi-transparent portions. For example, the character may move at the normal speed until the display is omitted, and may move at the special speed in the intermediate portion 61. In other words, the moving speed of the character may appropriately change during the movement. Similarly, the normal speed may not be constant when the moving distance TD is shorter than the threshold distance DD and there is no obstacle, and it may change in accordance with the moving distance TD (for example, the normal speed changes such that the time from the start of the movement to the arrival is unchanged). In this case, the difference between the special speed and the normal speed may be whether at least a portion of the display in the movement process is omitted or not. If the special speed and/or the normal speed changes in accordance with the moving distance TD, the moving action may also change correspondingly. Specifically, for example, each character executes, as the moving action, a walking action when the normal speed (or the special speed) is relatively low speed, a fast walking action when the normal speed (or the special speed) is faster than the relatively low speed, a sprinting action when the normal speed (or the special speed) is much faster than the relatively low speed, a running action when the normal speed (or the special speed) is high speed, and an action of using a vehicle when the normal speed (or the special speed) is higher than the high speed.

On the other hand, the semi-transparent portions in the case of the special speed are not limited to the first portion 62 and the last portion 63 of the movement process. For example, the semi-transparent portion may be provided in the middle (for example, in the center) of the movement process to show the movement process in a clearer manner. In this case, either one of semi-transparency of the first portion 62 and the last portion 63 may be omitted, or both may be omitted. In other words, no semi-transparent portions may be provided and the entire movement process may be not displayed, or an appropriate number of semi-transparent portions may be provided. The lengths of the semi-transparent portions may be the same or different. Similarly, the no-displayed portions may be set at appropriate locations in the movement process. Consequently, the instantaneous movement may occur in a plurality of parts of the movement process or in the entire movement process.

Furthermore, the setting of the no-displayed portions including the above-described instantaneous movement may be omitted as appropriate. In other words, the availability of the special speed may be switched as appropriate. For example, the switching condition may be used for such switching. The switching condition may include, for example, a play mode. Specifically, for example, in the case including a VR (Virtual Reality) mode used so that the user terminal device 4 is worn on the head (for example, as a head-mounted display or a part thereof) or a gyroscope mode (for example, a mode in which the shooting direction of the virtual camera is altered depending on the orientation of the user terminal device 4 by a gyro sensor built in the user terminal device 4) (including cases in which these are realized due to differences in the user terminal devices 4 itself), the switching conditions may be satisfied in these modes. In other words, in the case of the VR mode or the gyro mode, the use of the special speed may be omitted. Specifically, for example, the determination of the position relationship itself may be omitted in accordance with the switching conditions. That is to say, the determination of the position relationship itself may be cancelled (set to OFF). Alternatively, the use of the special speed may be restricted although the determination of the special speed is executed in accordance with the position relationship. In other words, the determination of the position relationship may not be cancelled (remaining set to ON), and switching may be made available between a case where the special speed is used depending on the switching conditions and a case where another appropriate speed is used (which may exceed the predetermined time before reaching), which does not omit the display (for example, in this case, the former case functions as the omitted display, and the latter case, in which the display is maintained without being omitted as a result, functions as a normal display). For example, as such an appropriate speed, the waiting character WC may move at the normal speed (including the case where the speed is constant and the case where the speed changes in accordance with the moving distance TD) even in the example of FIG. 11 or the like, and the same is true when the determination of the position relationship itself is cancelled (for example, in the latter case, the normal speed functions as the same moving speed). In such a mode, the change of the shooting direction of the virtual camera (the blurring of the image displayed in the field area 51) is so large that the user is likely to lose sight of the moving character if the no-displayed portion is included. For this reason, the switching condition is used to cancel the use of the special speed in such a case, and such a possibility is reduced. In other words, it is possible to adopt an appropriate moving speed in accordance with the mode. The moving action that utilizes such moving speed may be applied to various types of movement of each character.

Figure 14:
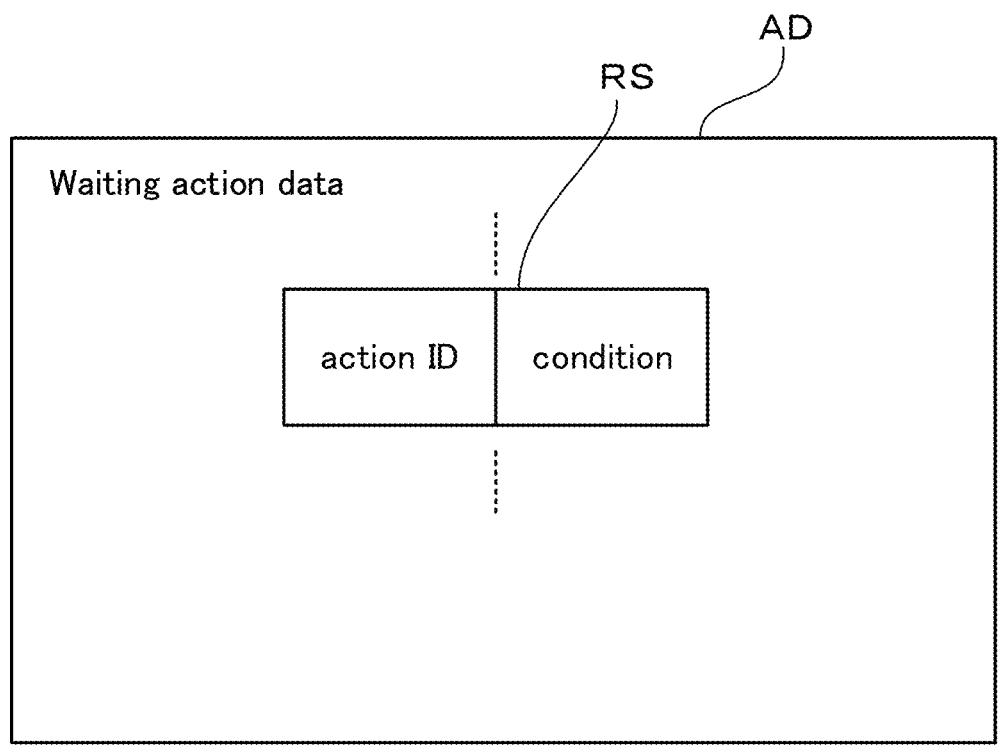
FIG. 14 is a diagram illustrating an example of a structure of a waiting action data.

Next, an example of the structure of the waiting action data AD will be described. The waiting action data AD is data for managing the waiting action of each waiting character image 43B. FIG. 14 is a diagram illustrating an example of the structure of the waiting action data AD. As shown in FIG. 14, the waiting action data AD includes a waiting action record RS that manages each waiting action and its conditions for each waiting action when a plurality of waiting actions are prepared. The waiting action record RS also includes information on an "action ID" and a "condition". The "action ID" is information that indicates a unique action ID for each waiting action in order to identify each waiting action. The action ID is managed such that the action ID is separately associated with a program for causing each waiting character image 43B to perform each waiting action.

The "condition" is information indicating the action condition necessary to cause each waiting character image 43B to perform each waiting action. For example, when an exclusive waiting action is prepared for each of the waiting character images 43B, the information of a unique character ID is described as the action condition for each character to identify each character. When the exclusive waiting action is an independent action, the information of the character ID of one character is described as the action condition in the "condition", and when the exclusive waiting action is the joint action of a plurality of characters, the information of the character ID indicating the characters is described as the action condition in the "condition." On the other hand, in the case of the waiting action (a joint action that can be performed by arbitrary character if the number of characters reaches a certain value, or an independent action that can be performed by anyone) in which no individual characters are identified and only the number of characters is a condition, information on the number of characters is described in the "condition" as the action condition. When location (for example, conditions indicating the surrounding environment such as "near a game machine", "near a pond" or the like), time (for example, conditions such as real time or a set time in the game or the like), or various items or the like are used as the action condition, the "condition" may include information indicating such location and the like as the action condition(s). Such information is recorded in the waiting action record RS such that the information is associated with each other. Incidentally, among the action conditions, the conditions of the joint action may be used as the joint action conditions.

Next, the procedures of the waiting character arrangement process, the waiting action control process, and the moving action control process performed by the web service management unit 24 will be described. The waiting character arrangement process is a process for displaying the waiting character image(s) 43B on the room screen 50. The web service management unit 24 starts the waiting character arrangement process of FIG. 15 every time the display of the room screen 50 is requested, and first determines whether or not the appearance condition is satisfied (Step S101). As described above, the appearance conditions include, for example, the admission condition and the target condition, the admission condition is satisfied in the room screen 50 each time, and the lottery is used as the target condition. Thus, for example, in Step S101, the web service management unit 24 determines that the appearance condition is satisfied along with the admission condition being satisfied, and randomly determines the waiting character image(s) 43B for the appearance target.

The web service management section 24 then determines the arrangement condition (Step S102). The arrangement condition is a condition for determining how the waiting character image(s) 43B-to-be-arranged, which is determined in Step S101, should be specifically arranged on the room screen 50. For example, the arrangement condition includes conditions of the location (for example, somewhere in the game field GF) where the waiting character image 43B should be arranged, and the combination (combination of a plurality of waiting character images 43B, e.g., if a plurality of waiting character images 43B are displayed on the room screen 50, two of the three characters are arranged close to each other and the remaining one character is arranged away from them, or all of them are arranged close to each other). The conditions for such locations and combinations may be set for each game field GF to be displayed on the room screen 50 or for each character.

Next, based on the determination results of Step S101 and Step S102, the web service management unit 24 causes each waiting character image 43B to be displayed on the room screen 50 by arranging each waiting character WC in the game field GF so that each waiting character image 43B of the appropriate combination is located in the appropriate position (Step S103). The web service management unit 24 ends this process after each of the waiting character images 43B is displayed. Accordingly, an appropriate number of waiting character images 43B, such as a single number or a plurality of characters, based on the appearance conditions are displayed on the room screen 50 in addition to the navigation character image 43A.

The waiting action control process is a process that causes each of the waiting character images 43B to perform the waiting action on the room screen 50. The web service management unit 24 starts the waiting action control process of FIG. 16 every time the room screen 50 including the character image (s) 43B is displayed, or every time the number of waiting character images 43B changes on the room screen 50 (including when the specific instruction is executed), and determines the waiting status of the waiting character image 43B on the room screen 50 (Step S201). The waiting status includes, for example, the game field GF, the waiting location, the number of the waiting character images 43B, each of the characters, and combinations thereof. The waiting status also includes the presence or absence of the specific instruction. In other words, the presence or absence of the specific instruction is also determined as the waiting status in Step S201 by the web service management unit 24.

The web service management unit 24 then determines the action condition (Step S202). The action condition is a condition for determining the waiting action that can be performed by each waiting character image 43B on the room screen 50. The action condition is managed by the waiting action data AD, for example, as information of "action". Thus, the web service management unit 24 determines which action condition is satisfied by the waiting status acquired in Step S201 upon referring to the information of the "action" in the waiting action data AD. In this case, if there exists the waiting character image 43B in which the specific instruction is executed, the web service management unit 24 excludes the waiting character image 43B from the object of determining the action condition, and determines that the waiting action to be performed by the waiting character image 43B is the specific action. When it is determined that a plurality of waiting actions are executable by the waiting character images 43B on the room screen 50 based on this action condition, the web service management unit 24 further specifies a waiting action from a plurality of waiting actions that should actually be executed by the waiting character images 43B. Specifically, the web service management unit 24 realizes such specification by, for example, a lottery. In other words, the web service management unit 24 randomly specifies the waiting action to be actually executed from a plurality of candidate waiting actions.

Next, the web service management unit 24 controls the actions of the waiting character images 43B so that each waiting character image 43B on the room screen 50 actually executes the waiting action based on the action condition determined in Step S202, or each waiting character image 43B on which the specific instruction is executed executes the specific action (Step S203). In other words, the web service management part 24 actually causes each waiting character image 43B to perform the waiting action (including the specific action) that was determined (or specified) in Step S202. The web service management unit 24 ends this process after causing each waiting character image 43B to actually perform the waiting action.

Figure 16:
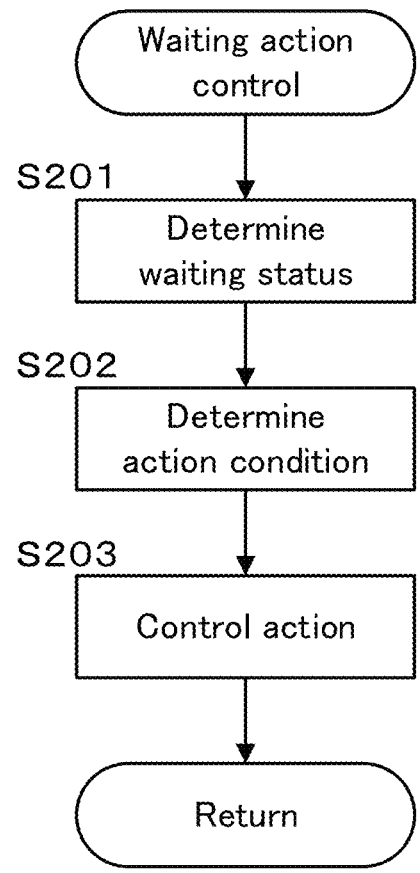
FIG. 16 is a flowchart illustrating an example of a procedure of a waiting action control process.

By carrying out the process of FIG. 16, each waiting character image 43B automatically executes the waiting action on the room screen 50. Such a waiting action includes the joint action. When the specific instruction is executed on the room screen 50, the waiting action of the waiting character image 43B in which the instruction is executed is changed to the specific action. When the number of the waiting character image(s) 43B that should perform the waiting action is changed by such specific actions, the waiting action of each waiting character image 43B is changed so that the waiting action, including a joint action, is appropriately performed by the number of characters remaining after the change.

Figure 17:
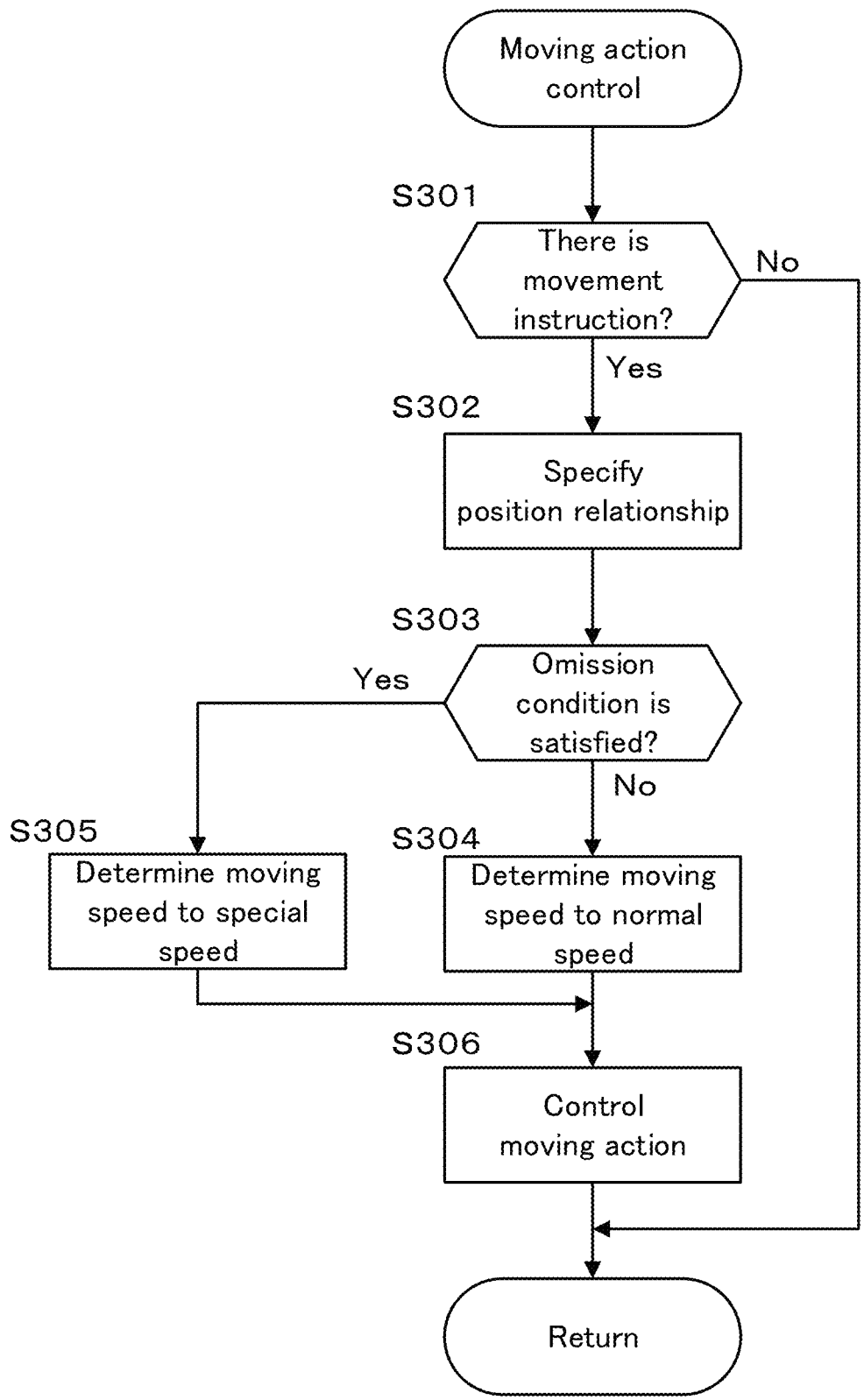
FIG. 17 is a flowchart illustrating an example of a procedure of a moving action control process.

The moving action control process is a process to cause each character to perform a moving action on the room screen 50. Although the moving action control process may be performed at a suitable time when the movement instruction is executable, the process of FIG. 17 will be described as the process in a case where the movement instruction is executed during the specific action, for example. Furthermore, the example of FIG. 17 shows a case where the omission condition for determining the necessity of omission of the display includes the above-described switching condition. In this case, the web service management unit 24 starts the moving action control process of FIG. 17 repeatedly in a predetermined cycle from the start of the specific action to its end, and first determines whether there is the movement instruction (Step S301). If there is no movement instruction, the web service management unit 24 skips the subsequent processing and ends this processing.

On the other hand, when there is the movement instruction, the web service management unit 24 specifies the position relationship between the waiting position and the arrival position (Step S302). Such a position relationship includes, for example, a shortest distance between the waiting position and the arrival position, and the presence or absence of an obstacle when the character moves the shortest distance. In other words, the web service management unit 24 calculates, for example, the shortest distance between the waiting position and the arrival position in Step S302 as such a position relationship, and determines the presence or absence of an obstacle on such a shortest distance.

Subsequently, the web service management unit 24 determines whether the position relationship specified in Step S302 satisfies the omission condition (Step S303). The omission condition is satisfied if, for example, the shortest distance between the waiting position and the arrival position is longer than the threshold distance DD, or if there is an obstacle in the movement path when the character moves the shortest distance. In other words, the web service management unit 24 determines, for example, in Step S302, whether the shortest distance (moving distance TD) exceeds the threshold distance DD, or whether there is an obstacle in the movement path. The omission condition includes the above-described switching condition. The web service management unit 24 determines that the omission condition is satisfied (met) when the switching condition is not met, and determines that the omission condition is not satisfied (met) when the switching condition is met. Thus, the web service management section 24 further determines whether the switching condition is satisfied or not. The switching condition is satisfied in the case of VR mode or gyro mode, for example, as described above. In other words, the web service management section 24 determines whether the mode being played corresponds to the VR mode or the gyro mode. Then, the web service management unit 24 determines that the omission condition is not met as the switching condition is met when the mode being played is the VR mode or the like, and determines that the omission condition is met as the switching condition is not met when the mode is not the VR mode or the like.

If the omission condition is not satisfied (for example, when the moving distance TD is shorter than the threshold distance DD, or when there is no obstacle in the movement path, or when the switching condition is met), the web service management unit 24 determines that the moving speed of the waiting character image 43B, which is to perform the moving action, should be the normal speed (Step S304). On the other hand, when the omission condition is satisfied (for example, when the moving distance TD is longer than the threshold distance DD, or when there is an obstacle in the movement path, or when the switching condition is not met), the web service management unit 24 determines that the moving speed of the waiting character image 43B, which is to perform the moving action, should be the special speed (Step S305).

Subsequently, the web service management unit 24 controls the moving action of the waiting character image 43B for which the movement instruction is executed (Step S306). Specifically, for example, the web service management unit 24 controls the moving action of the waiting character image 43B in which the movement instruction is executed, so that the moving action that moves at the normal speed is executed, i.e., so that the room screen 50 in the example of FIG. 9 is displayed, when Step S304 determines that the moving speed should be the normal speed. On the other hand, for example, the web service management unit 24 controls the movement of the waiting character image 43B in which the movement instruction is executed, so that the moving action that moves at the special speed is executed, i.e., so that the moving action including the partially no-display (instantaneous movement) and partially semi-transparent display shown in the example of FIG. 13 is executed, when Step S305 determines that the moving speed should be the special speed. Then, the web service management unit 24 ends this process after controlling the moving action of the waiting character image 43B.

By carrying out the process of FIG. 17, the moving action is executed in which the waiting character image 43B moves to a position next to the navigation character image 43A when the movement instruction is given to the waiting character image 43B during the specific action. Such a moving action is executed at the normal speed if the moving distance TD is shorter than the threshold distance DD and there is no obstacle in the movement path. As a result, for example, the room screen 50 showing the moving action, such as the example in FIG. 9, is displayed. On the other hand, if the moving distance TD is longer than the threshold distance DD or/and there are obstacles in the movement path, the moving action is executed at the specific speed. As a result, for example, the room screen 50 is displayed showing the moving action, including the no-display (instantaneous movement) and the semi-transparent display, such as the example in FIG. 13. Furthermore, the use of the normal speed and the use of the special speed are switched in accordance with the switching condition. Incidentally, the switching condition may be prepared as a condition separate from the omission condition. In this case, for example, the process in the example of FIG. 17 (however, the omission condition does not include the switching condition) may be executed when the switching condition is not satisfied, while the web service management unit 24 may separately perform the process not including Step S303 and Step S304 of the example of FIG. 17 when the switching condition is satisfied, instead of the process of FIG. 17 to realize the moving action.

As described above, in accordance with this embodiment, for example, when the waiting character WC moves from the waiting position WP to the guide position GP in the game field GF, the position relationship between them is specified, and the moving speed of the waiting character WC is changed between the normal speed and the special speed in accordance with the position relationship. Thus, the moving speed of the waiting character WC can be increased depending on the position relationship when the moving time is longer if the character moves at the normal moving speed, e.g., when the moving distance TD is relatively long (longer than the threshold distance DD), or when the waiting character WC cannot move the shortest distance because of obstacles such as the pond PD in the movement process or the like. More specifically, in such a case, the special speed that utilizes the instantaneous movement in a part of the movement process can be employed as the special speed. Therefore, the moving time can be reduced even when the moving distance TD becomes longer. This can reduce the disadvantages associated with the increase in the moving distance TD, and therefore the game field GF can be set relatively wide. The reduction of such disadvantages also allows a long moving distance TD to be set to bypass obstacles such as the pond PD, for example, so that obstacles can be placed in the shortest path. This allows for a more flexible setting of the game field GF. As a result, it is possible to avoid the movement of the waiting character WC that would interfere with play, and also possible to allow the waiting character WC to perform more free actions in the game field GF.

Furthermore, since the game field GF can be given the capacity to place a large number of waiting characters WC, a plurality of characters owned by the user can be arranged in the game field GF not only as navigation character NC but also as the waiting characters WC. Specifically, since two or more waiting characters WC can be arranged in the game field GF, opportunities can be provided for the user to contact the waiting characters WC in addition to the navigation character NC. This can provide opportunities for a plurality of waiting characters WC to contact the user, and therefore can suppress the fixation of the characters who contact the user and the user's boredom with the game. Moreover, since it is possible to cause these two or more waiting characters WC to perform the joint action, such joint action can create a pleasant atmosphere between the two or more waiting characters WC, and/or produce more natural behaviors when these waiting characters WC are acquainted or the like. As a result, the waiting characters WC other than the navigation character NC can be displayed on the room screen 50 in a natural manner. Furthermore, when the number of waiting characters changes due to movement, the specific action or the like, such a joint action is shifted to an appropriate action according to the number of characters after the change. Therefore, even after such a change in the number of persons (characters), a natural performance can be realized in accordance with the change in the number of persons.

If the no-displayed portion (intermediate portion 61) is provided as a part of the movement process during the movement at the special speed and the special speed is inappropriately fast as the moving speed of the waiting character WC (for example, the moving speed that looks unnatural as a person's moving speed), such inappropriateness (unnaturalness) can be mitigated by such no-displayed portion (omission of the movement display). Similarly, if the front and back of such no-displayed portion (the first portion 62 and the last portion 63) are displayed semi-transparently, transition to such no-display (from display to the omission of display) and transition from no-display to re-display can be shown in a relatively natural manner. In addition, if the preliminary motions are performed in such semi-transparent portions, such preliminary motions can be used to further naturally produce the transition to the no-display and the transition from the no-display to the re-display. On the other hand, if the use and the no-use of such no-display can be switched in accordance with the switching condition, such switching condition can be used to suppress the inappropriate omission of the movement display. By such mitigation, transitions, suppression and so on, the entertainment value of the game can be enhanced.

In the above-described embodiment, the web service management unit 24 of the center server 2 functions as a relationship specifying unit, a speed changing unit, and a movement displaying unit by executing the procedure of FIG. 17. Specifically, the web service management unit 24 of the center server 2 functions as the relationship specifying unit by executing the process of Step S302 in the procedure of FIG. 17, functions as the speed changing unit by changing the moving speed between the normal speed and the special speed through the process of Step S303 (or the processes of Steps S304 and S305), and functions as the movement displaying unit by executing the process of Step S306 after the process of Step S305. Furthermore, the web service management unit 24 of the center server 2 functions as a character displaying unit by executing Step S103 in the procedure of FIG. 15. In addition, the web service management unit 24 of the center server 2 functions as a joint action controlling unit by executing Step S203 in the procedure of FIG. 13. More specifically, it functions as the joint action controlling unit when two or more waiting character images 43B are caused to perform the joint action in Step S203. Further, the web service management unit 24 of the center server 2 functions as a moving action controlling unit by executing Step S306 in the procedure of FIG. 17.

Figure 15:
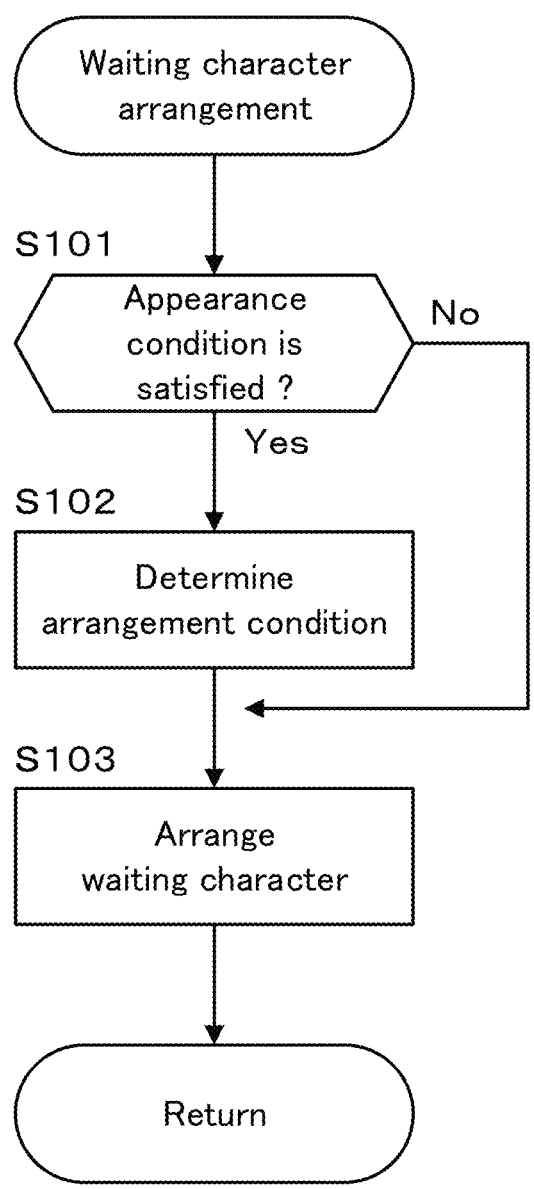
FIG. 15 is a flowchart illustrating an example of a procedure of a waiting character placement process.

The present invention is not limited to the above-mentioned embodiment, and may be implemented in one or more embodiments in which appropriate modifications or changes are made. For example, in the above-mentioned embodiment, the processes of FIG. 15 to FIG. 17 are executed on the center server 2 side. However, the present invention is not limited to such an embodiment. For example, all or part of the processes of FIG. 15 to FIG. 17 may be executed by the user terminal device 4. In this case, the user terminal device 4 may function as the center server 2. As a result, the center server 2 itself (including a case where the center server is constituted by a plurality of server devices) or the user terminal device 4 itself may function as the game system of the present invention. Furthermore, various game devices, such as, for example, commercial game devices, may serve as the user terminal devices 4. In other words, various game devices may be used in place of the user terminal devices 4.

Various aspects of the present invention derived from each of the above-mentioned embodiments, modifications and changes will be described below. Incidentally, in the following description, reference numerals of corresponding parts illustrated in the accompanying drawings are appended in parentheses to facilitate understanding of each of the aspects of the invention, but the invention is not limited to the illustrated embodiment thereby.

The game system of the present invention is a game system providing a game that progresses through a character (WC) configured to move in accordance with a user instruction in a game field (GF) of a display device (37) adapted to display a game screen (50) including the game field (GF), and the game system comprises a relationship specifying unit (24) that specifies a position relationship between a predetermined position (WP) and an arrival position (GP) when the character is instructed to move from the predetermined position to the arrival position in the game field by a user, and a speed changing unit (24) that changes a moving speed of the character in accordance with the position relationship when the character moves from the predetermined position to the arrival position.

According to the present invention, when the character (not only the character corresponding to a person, but also various things such as animals and cars, regardless of having personalities or not) moves from the predetermined position to the arrival position in the game field, the position relationship between the predetermined positions and the arrival position is specified, and the moving speed of the character is changed in accordance with the position relationship. Thus, the moving time can be reduced even when the moving distance is long because the moving speed of the character can be increased in cases where the moving time becomes long if the character moves at the normal moving speed, e.g., when the moving distance is relatively long depending on the position relationship. This can reduce the disadvantages associated with the increase in moving distance, and therefore the game field can be set relatively wide. This reduction in disadvantages also allows a long moving distance to be set, e.g., a long moving distance bypassing obstacles, so that obstacles can be placed in the shortest path. This allows for a more flexible setting of the game field. As a result, not only the movement of the character that interfere with play can be avoided, but also the character can be allowed to perform more free actions in the game field. In addition, the game field can have the capacity to arrange a large number of character, thereby allowing a plurality of characters owned by the user to be arranged in the game field. This can provide opportunities for the user to contact a plurality of characters, and therefore can prevent the user from getting bored. Incidentally, for example, if the moving distance is short in accordance with the position relationship, the moving speed may be reduced. In other words, the phrase "change in moving speed" may include a decrease in moving speed in accordance with the position relationship.

Various types of the position relationships between the predetermined position and the arrival position in the game field may be employed. For example, the moving distance or a degree of difficulty of movement may be employed as such a position relationship. For example, the degree of difficulty of movement may be adopted when there are various obstacles (including obstacles that hinder movement and various characters) in the movement path, or when there are various restrictions on movement. Similarly, various restrictions on movement, such as time of year or the restrictions on the manner of movement (for example, restrictions such as "walking only", or "certain vehicles only" or the like) may be employed as the restrictions on movement. Thus, the moving speed may also be changed accordingly. For example, the moving speed may be changed when the position relationship satisfies a predetermined condition (for example, when the moving distance is longer than a predetermined distance), while otherwise the moving speed may not be changed and the moving speed may be constant. Alternatively, the moving speed may be changed as appropriate depending on the moving distance so that the moving time required from the start of the movement to the arrival is unchanged. For example, in one aspect of the game system of the present invention, the relationship specifying unit may specify, as the position relationship, at least one of a shortest distance (TD) connecting the predetermined position and the arrival position with a straight line and presence/absence of an obstacle (PD) that becomes an obstacle to the movement if the character moves the shortest distance, and the speed changing unit may change the moving speed of the character to a special speed that makes a moving time from the predetermined position to the arrival position less than a predetermined time in at least one of cases where the shortest distance is longer than a threshold distance and where there is the obstacle in the shortest distance, depending on the position relationship.

Various types of moving speeds may be employed as the special speed. For example, a fixed speed may be employed as the special speed, or various types of moving speeds may be employed as the special speed. In other words, the special speed may be fixed or variable. The movement of the character at such special speed may or may not be displayed on the game screen. In other words, the display of the movement of the character at the special speed may be omitted. Specifically, for example, in one aspect of utilizing the special speed of the present invention, the game system comprises a movement displaying unit (24) that displays the movement of the character so that when the character moves at the special speed, a display of the character is omitted in at least part (61) of a movement process from the predetermined position to the arrive position. In this case, even if the special moving speed is inappropriately fast as the moving speed of the character (for example, if the character is a person, the speed that is unnatural as the speed at which a person moves or the like), such inappropriateness (unnaturalness) can be mitigated by omission of the movement display.

In cases where the movement display of the character is omitted, the display may be omitted as appropriate. For example, all of the movement display may be omitted, or a part of the movement display may be omitted. In the case where the part is omitted, the omitted part may be any suitable part. For example, the movement displaying unit of the present invention may display the movement of the character so that the character is displayed semi-transparently before and after (62, 63) the part of the movement process when the display of the character is omitted in the part of the movement process. In this case, the transition from the display to the omission of the display and the transition from the omission of the display to the display may be shown in a relatively natural manner.

In the case where the character is displayed semi-transparently before and after the omission of the movement display, the character may be displayed semi-transparently in any suitable state (including a case where the character is performing various actions and a case where the character is understood not to be performing actions such as merely standing). For example, the semitransparent character may be displayed to perform a particular fixed motion. In this case, before and after the omission of the display, the fixed motion may be the same or different from each other. Alternatively, the semitransparent character may perform a variable motion. For example, such a motion may change depending on the situation at the predetermined position and the situation at the arrival position in the game field. For example, when the character is sitting at the predetermined position, the character may perform a standing motion before the display is omitted. On the other hand, when the character is about to sit on something at the arrival position, the character may perform a sitting motion after the display is omitted. More specifically, for example, while the character is being displayed semi-transparently, the character may perform any suitable preliminary motion. The variable motion is also not limited to the motion specified based on such the play situations. For example, the variable motion may be determined based on the operation result of the user or the lottery. For example, in one aspect of the present invention utilizing the semi-transparent display, the movement displaying unit may display the movement of the characters such that the character performs semi-translucently a first preliminary motion for starting the movement before the part of the movement process, and a second preliminary motion for arrival after the part of the movement process, respectively. In this case, the movement displaying unit can show the transition from display to omission of display and the transition from omission of display to display in a more natural manner by using such preliminary motions.

On the other hand, whether to execute the above-described omission of the movement display may be adjusted based on any suitable conditions. For example, such omission of the movement display may not be performed if it is not suitable for the omission of the movement display, e.g., when a user's field of view changes significantly in the game field and the user may lose track of the character if the movement display is omitted. Specifically, for example, in one aspect of the present invention having the movement displaying unit, the movement displaying unit may, in a case where the speed changing unit changes the movement speed of the character to the special speed in accordance with the position relationship, switch the display of the movement of the character between a omitted display and a normal display based on a switching condition for switching the display between the omitted display in which the display of the character is omitted in the part of the movement process and the normal display in which the character is displayed without being omitted in the part of the movement process. Alternatively, in one aspect of the present invention wherein the character moves at the special speed, the speed changing unit may change the moving speed of the character to the special speed if a switching condition for determining whether or not to change to the special speed is not satisfied, and may employ a same moving speed as when the shortest distance is shorter than the threshold distance as the moving speed of the character even in at least one of the cases where the shortest distance is longer than the threshold distance and where there is the obstacle in the shortest distance, if the switching condition is satisfied. In these cases, inappropriate omission of the movement display can be suppressed.

The character may perform a move on various game screens. For example, the character may perform the move on various setting screens as a type of the game screen, or may perform the move on the play screen for play progressions. For example, in one aspect of the game system of the present invention, when the game screen includes a home screen (50) for selecting one of a plurality of progressions with different uses, the relationship specifying unit may use at least a portion of the home screen as the game field and specify the position relationship in the portion of the home screen.

The character may also perform movements for various purposes. Similarly, any suitable positions in the game field may be used as the predetermined position and the arrival position. For example, in one aspect of the present invention that utilizes the home screen as a type of the game screen, the relationship specifying unit may utilize a waiting character, a movement instruction, a waiting position, and a guide position, as the character, the instruction for moving the character, the predetermined position, and the arrival position, respectively, to cause the waiting character to perform a moving action to move from the waiting position (WP) of the waiting character to the guide position (GP) where a progression should be performed in accordance with the movement instruction to cause the waiting character to perform a same progression as the guide character, when the guide character (NC) that guides a progression including selection from the plurality of progressions on the home screen and the waiting character (WC) that functions as a replacement for the guide character are displayed at different positions on the home screen.

A plurality of characters may exist on the game screen, or only one character may exist on the game screen. In a case where a plurality of characters exist on the game screen, the characters to be moved may be all of those characters or some of them (including two characters or more). For example, in one aspect of the present invention using the home screen, the relationship specifying unit may utilize one waiting character among a plurality of waiting characters as the character so that the one waiting character performs the moving action in accordance with the movement instruction, when the home screen includes the plurality of waiting characters.

On the other hand, a non-transitory computer readable storage medium according to the present invention is a non-transitory computer readable storage medium storing a computer program that is configured to cause a computer connected to the display device and an input device (36) adapted to input an instruction of the user to function as the respective units of the above-described game system. Through the computer program of the present invention, the game system of the present invention can be realized. Incidentally, the games of the present invention may be provided in various aspects. For example, various devices may be employed as an input device of the present invention as long as the user instruction can be inputted. For example, the input device that inputs the user instruction through the user operation, such as a touch screen, or the input device that inputs the user instruction through the user movement, such as a camera, may be employed as the input device of the present invention.

The invention claimed is:

1. A game system providing a game that progresses through a character configured to move in accordance with a user instruction in a game field of a display device adapted to display a game screen including the game field, and comprising:
    a relationship specifying unit that specifies a position relationship between a predetermined position and an arrival position when the character is instructed to move from the predetermined position to the arrival position in the game field by a user; and
    a speed changing unit that changes a moving speed of the character in accordance with the position relationship when the character moves from the predetermined position to the arrival position,
    wherein the relationship specifying unit specifies, as the position relationship, at least one of a shortest distance connecting the predetermined position and the arrival position with a straight line and a presence/absence of an obstacle that becomes an obstacle to the movement if the character moves the shortest distance,
    the speed changing unit changes the moving speed of the character to a special speed that makes a moving time from the predetermined position to the arrival position less than a predetermined time in at least one of cases where the shortest distance is longer than a threshold distance and where there is the obstacle in the shortest distance, depending on the position relationship, and
    the speed changing unit changes the moving speed of the character to the special speed if a switching condition for determining whether or not to change to the special speed is not satisfied, and employs a same moving speed as when the shortest distance is shorter than the threshold distance as the moving speed of the character even in at least one of the cases where the shortest distance is longer than the threshold distance and where there is the obstacle in the shortest distance, if the switching condition is satisfied.

2. The game system according to claim 1, comprising a movement displaying unit that displays the movement of the character so that when the character moves at the special speed, a display of the character is omitted in at least part of a movement process from the predetermined position to the arrive position.

3. The game system according to claim 2, wherein the movement displaying unit displays the movement of the character so that the character is displayed semi-transparently before and after the part of the movement process when the display of the character is omitted in the part of the movement process.

4. The game system according to claim 3, wherein the movement displaying unit displays the movement of the character such that the character performs semi-translucently a first preliminary motion for starting the movement before the part of the movement process, and a second preliminary motion for arrival after the part of the movement process, respectively.

5. The game system according to claim 2, wherein the movement displaying unit switches, in a case where the speed changing unit changes the moving speed of the character to the special speed in accordance with the position relationship, the display of the movement of the character between an omitted display and a normal display based on a switching condition for switching the display between the omitted display in which the display of the character is omitted in the part of the movement process and the normal display in which the character is displayed without being omitted in the part of the movement process.

6. The game system according to claim 1, wherein when the game screen includes a home screen for selecting one of a plurality of progressions with different uses, the relationship specifying unit uses at least a portion of the home screen as the game field and specifies the position relationship in the portion of the home screen.

7. The game system according to claim 6, wherein the relationship specifying unit utilizes a waiting character, a movement instruction, a waiting position, and a guide position, as the character, the user instruction for moving the character, the predetermined position, and the arrival position, respectively, to cause the waiting character to perform a moving action to move from the waiting position of the waiting character to the guide position where a progression should be performed in accordance with the movement instruction to cause the waiting character to perform a same progression as a guide character, when the guide character that guides a progression including selection from the plurality of progressions on the home screen and the waiting character that functions as a replacement for the guide character are displayed at different positions on the home screen.

8. The game system according to claim 7, wherein the relationship specifying unit utilizes one waiting character among a plurality of waiting characters as the character so that the one waiting character performs the moving action in accordance with the movement instruction, when the home screen includes the plurality of waiting characters.

9. A non-transitory computer readable storage medium storing a computer program that, when executed by a computer connected to a display device and an input device adapted to input a user instruction, causes the computer to function as at least:
 a relationship specifying unit that specifies a position relationship between a predetermined position and an arrival position when a character is instructed to move from the predetermined position to the arrival position in a game field by a user; and
 a speed changing unit that changes a moving speed of the character in accordance with the position relationship when the character moves from the predetermined position to the arrival position,
 wherein the relationship specifying unit specifies, as the position relationship, at least one of a shortest distance connecting the predetermined position and the arrival position with a straight line and a presence/absence of an obstacle that becomes an obstacle to the movement if the character moves the shortest distance,
 the speed changing unit changes the moving speed of the character to a special speed that makes a moving time from the predetermined position to the arrival position less than a predetermined time in at least one of cases where the shortest distance is longer than a threshold distance and where there is the obstacle in the shortest distance, depending on the position relationship, and
 the speed changing unit changes the moving speed of the character to the special speed if a switching condition for determining whether or not to change to the special speed is not satisfied, and employs a same moving speed as when the shortest distance is shorter than the threshold distance as the moving speed of the character even in at least one of the cases where the shortest distance is longer than the threshold distance and where there is the obstacle in the shortest distance, if the switching condition is satisfied.

10. The non-transitory computer readable storage medium according to claim 9, comprising a movement displaying unit that displays the movement of the character so that when the character moves at the special speed, a display of the character is omitted in at least part of a movement process from the predetermined position to the arrive position.

11. The non-transitory computer readable storage medium according to claim 10, wherein the movement displaying unit displays the movement of the character so that the character is displayed semi-transparently before and after the part of the movement process when the display of the character is omitted in the part of the movement process.

12. The non-transitory computer readable storage medium according to claim 11, wherein the movement displaying unit displays the movement of the character such that the character performs semi-translucently a first preliminary motion for starting the movement before the part of the movement process, and a second preliminary motion for arrival after the part of the movement process, respectively.

13. The non-transitory computer readable storage medium according to claim 9, wherein when a game screen includes a home screen for selecting one of a plurality of progressions with different uses, the relationship specifying unit uses at least a portion of the home screen as the game field and specifies the position relationship in the portion of the home screen.

14. The non-transitory computer readable storage medium according to claim 13, wherein the relationship specifying unit utilizes a waiting character, a movement instruction, a waiting position, and a guide position, as the character, the user instruction for moving the character, the predetermined position, and the arrival position, respectively, to cause the waiting character to perform a moving action to move from the waiting position of the waiting character to the guide position where a progression should be performed in accordance with the movement instruction to cause the waiting character to perform a same progression as a guide character, when the guide character that guides a progression including selection from the plurality of progressions on the home screen and the waiting character that functions as a replacement for the guide character are displayed at different positions on the home screen.

15. A control method of controlling a computer which is incorporated into a game system providing a game that progresses through a character configured to move in accordance with a user instruction in a game field of a display device adapted to display a game screen including the game field, wherein the control method of controlling the computer comprises:
 a relationship specifying step that specifies a position relationship between a predetermined position and an arrival position when the character is instructed to move from the predetermined position to the arrival position in the game field by a user; and
 a speed changing step that changes a moving speed of the character in accordance with the position relationship when the character moves from the predetermined position to the arrival position,
 wherein the relationship specifying step specifies, as the position relationship, at least one of a shortest distance connecting the predetermined position and the arrival position with a straight line and presence/absence of an obstacle that becomes an obstacle to the movement if the character moves the shortest distance, the speed changing step changes the moving speed of the character to a special speed that makes a moving time from the predetermined position to the arrival position less than a predetermined time in at least one of cases where the shortest distance is longer than a threshold distance and where there is the obstacle in the shortest distance, depending on the position relationship, and the speed changing step changes the moving speed of the character to the special speed if a switching condition for determining whether or not to change to the special speed is not satisfied, and employs a same moving speed as when the shortest distance is shorter than the threshold distance as the moving speed of the character even in at least one of the cases where the shortest distance is longer than the threshold distance and where there is the obstacle in the shortest distance, if the switching condition is satisfied.

16. The control method according to claim 15, comprising a movement displaying step that displays the movement of the character so that when the character moves at the special speed, a display of the character is omitted in at least part of a movement process from the predetermined position to the arrive position.

17. The control method according to claim 16, wherein the movement displaying step displays the movement of the character so that the character is displayed semi-transparently before and after the part of the movement process when the display of the character is omitted in the part of the movement process.

18. The control method according to claim 17, wherein the movement displaying step displays the movement of the character such that the character performs semi-translucently a first preliminary motion for starting the movement before the part of the movement process, and a second preliminary motion for arrival after the part of the movement process, respectively.

19. The control method according to claim 15, wherein when the game screen includes a home screen for selecting one of a plurality of progressions with different uses, the relationship specifying step uses at least a portion of the home screen as the game field and specifies the position relationship in the portion of the home screen.

20. The control method according to claim 19, wherein the relationship specifying step utilizes a waiting character, a movement instruction, a waiting position, and a guide position, as the character, the user instruction for moving the character, the predetermined position, and the arrival position, respectively, to cause the waiting character to perform a moving action to move from the waiting position of the waiting character to the guide position where a progression should be performed in accordance with the movement instruction to cause the waiting character to perform a same progression as a guide character, when the guide character that guides a progression including selection from the plurality of progressions on the home screen and the waiting character that functions as a replacement for the guide character are displayed at different positions on the home screen.

* * * * *